(12) United States Patent
Levit et al.

(10) Patent No.: US 10,430,606 B1
(45) Date of Patent: Oct. 1, 2019

(54) SYSTEM AND METHOD FOR IMPLEMENTING DOMAIN BASED ACCESS CONTROL ON QUERIES OF A SELF-DESCRIBING DATA SYSTEM

(71) Applicant: ARAS CORPORATION, Andover, MA (US)

(72) Inventors: Boris Levit, Minsk (BY); Sergey Murashko, Minsk (BY); Valentsin Shapavalau, Minsk (BY); Andrei Samsonau, Minsk (BY); Gregory Rasin, Andover, MA (US); Andrey Knourenko, Minsk (BY)

(73) Assignee: ARAS CORPORATION, Andover, MA (US)

( * ) Notice: Subject to any disclaimer, the term of this patent is extended or adjusted under 35 U.S.C. 154(b) by 0 days.

(21) Appl. No.: 16/390,985

(22) Filed: Apr. 22, 2019

Related U.S. Application Data

(60) Provisional application No. 62/664,557, filed on Apr. 30, 2018.

(51) Int. Cl.
*G06F 21/62* (2013.01)
*G06F 16/2455* (2019.01)
*G06F 16/242* (2019.01)
*H04L 29/06* (2006.01)

(52) U.S. Cl.
CPC ...... *G06F 21/6227* (2013.01); *G06F 16/2423* (2019.01); *G06F 16/2448* (2019.01); *G06F 16/24566* (2019.01); *H04L 63/101* (2013.01); *H04L 63/102* (2013.01)

(58) Field of Classification Search
CPC .......... G06F 21/6227; G06F 16/24566; G06F 16/2423; G06F 16/2448; H04L 63/101; H04L 63/102
See application file for complete search history.

(56) References Cited

U.S. PATENT DOCUMENTS

| | | | | |
|---|---|---|---|---|
| 7,987,269 | B1* | 7/2011 | Mayhead | G06Q 10/06 709/226 |
| 8,024,794 | B1* | 9/2011 | Feldman | G06F 21/6218 235/382 |
| 10,009,337 | B1* | 6/2018 | Fischer | H04L 63/105 |
| 10,037,339 | B1* | 7/2018 | Kleinpeter | G06F 21/6218 |

(Continued)

*Primary Examiner* — Darren B Schwartz
(74) *Attorney, Agent, or Firm* — Dickinson Wright PLLC

(57) ABSTRACT

A method for implementing access controls for items of data belonging to a self-describing data structure including obtaining a query definition specifying a requested item of data in the self-describing data structure, determining domains associated with the requested item, the domains including a set of items within the self-describing data structure on an execution path of a query executed according to the query definition. For each respective domain associated with the requested item, the method includes determining subdomains associated with the requested item, determining a role of the user for the respective domain, the role is associated with a set of access permissions to items of data within the domain, and generating an output corresponding to whether access to the requested item is granted based on a policy for each of the subdomains associated with the requested item and the role of the user for the domain.

17 Claims, 32 Drawing Sheets

(56) References Cited

U.S. PATENT DOCUMENTS

| | | | |
|---|---|---|---|
| 2002/0169956 A1* | 11/2002 | Robb | G06F 21/6218 |
| | | | 713/166 |
| 2004/0225893 A1* | 11/2004 | Ng | G06F 21/10 |
| | | | 726/27 |
| 2004/0250120 A1* | 12/2004 | Ng | G06F 21/6227 |
| | | | 726/17 |
| 2005/0160263 A1* | 7/2005 | Naizhen | G06F 21/6209 |
| | | | 713/167 |
| 2006/0050870 A1* | 3/2006 | Kimmel | H04L 63/0428 |
| | | | 380/30 |
| 2008/0317012 A1* | 12/2008 | Singh | H04L 45/04 |
| | | | 370/357 |
| 2011/0099605 A1* | 4/2011 | Cha | H04W 12/06 |
| | | | 726/3 |
| 2012/0185930 A1* | 7/2012 | Desai | G06F 21/6218 |
| | | | 726/13 |
| 2013/0232539 A1* | 9/2013 | Polunin | G06Q 10/047 |
| | | | 726/1 |
| 2014/0075565 A1* | 3/2014 | Srinivasan | G06Q 10/06315 |
| | | | 726/26 |
| 2015/0213285 A1* | 7/2015 | Malko | G06F 21/6218 |
| | | | 726/29 |
| 2015/0350219 A1* | 12/2015 | Selander | H04L 63/102 |
| | | | 726/1 |
| 2015/0373004 A1* | 12/2015 | Hopkins | G06F 16/278 |
| | | | 726/6 |
| 2016/0104005 A1* | 4/2016 | Toussaint | G06F 21/6218 |
| | | | 707/783 |
| 2017/0099321 A1* | 4/2017 | Frahim | H04L 63/20 |
| 2018/0181715 A1* | 6/2018 | Cline | H04L 51/043 |

\* cited by examiner

FIG. 1

$\int^{100}$

<Item type = "Part" id="ABCDEF012345" action="get"/>
      105                    110              115

FIG. 3

```
<Item type="Part" action="add">
    <item_number>999-888</item_number>
    <description>Some Assy</description>
    <Relationships>
        <Item type="Part_BOM" action="add">
            <quantity>10</quantity>
            <related_id>
                <Item type="Part" action="add">
                    <item_number>123-456</item_number>
                    <description>1/4w 10% 10K Resistor</description>
                </Item>
            </related_id>
        </Item>
    </Relationships>
</Item>
```

FIG. 7A

```xml
<?xml version="1.0"?>
<AML>
  <Item action="qry_ExecuteQueryDefinition" type="qry_QueryDefinition">
    <root_query_item_ref_id>part_1</root_query_item_ref_id>
    <name>UseCase_1</name>
    <Relationships>
      <Item type="qry_QueryCondition">
        <condition_xml>
          <![CDATA[<condition> <eq> <property ref-id="TopPart_id_GUID"/> <property ref-id="PBom_sourceId_GUID"/> </eq> </condition> ]]>
        </condition_xml>
        <ref_id>join_cond_1</ref_id>
      </Item>
      <Item type="qry_QueryCondition">
        <condition_xml>
          <![CDATA[<condition> <eq> <property ref-id="PBom_relatedId_GUID"/> <property ref-id="RelPart_id_GUID"/> </eq> </condition> ]]>
        </condition_xml>
        <ref_id>join_cond_2</ref_id>
      </Item>
      <Item type="qry_QueryCondition">
        <condition_xml>
          <![CDATA[<condition> <gt> <property ref-id="PBom_quantity_GUID"/> <constant>5</constant> </gt> </condition> ]]>
        </condition_xml>
        <ref_id>cond_1</ref_id>
      </Item>
      <Item type="qry_QueryItem">
        <alias>TopPart</alias>
        <condition_ref_id/>
        <item_type type="ItemType" name="Part"
          keyed_name="Part">4F1AC04A2B484F3ABA4E20DB63808A88</item_type>
        <ref_id>part_1</ref_id>
        <Relationships>
          <Item type=" qry_QueryItemSelectProperty">
            <property_ref_id>TopPart_id_GUID</property_ref_id>
          </Item>
          <Item type="qry_QueryItemSelectProprty">
            <property_ref_id>TopPart_itemNumber_GUID</property_ref_id>
          </Item>
          <Item type="qry_QueryItemSelectProperty">
            property_ref_id>TopPart_createdById_GUID</property_ref_id>
          </Item>
          <Item type="qry_QueryItemSortProperty">
            <property_ref_id>TopPart_name_QUID</property_ref_id>
            <sort_order>128</sort_order>
            <sort_order_direction>Ascending</sort_order_direction>
          </Item>
        </Relationships>
```

705 — outer Item / root_query
710a, 710b, 710c — QueryCondition items
715a — QueryItem
720a, 720b, 720c — QueryItemSelectProperty items
725 — QueryItemSortProperty
700

FIG. 7B

```
                                                                    700
                                                                   /
              </Item>
            - <Item type="qry_QueryItem">
                <alias>PBom</alias>
                <condition_ref_id>cond_1</condition_ref_id>
  715b        <item_type type="ItemType" name="Part BOM" keyed_name="Part
                    BOM" >5E9C5A12CC58413A8670CF4003C57848</item_type>
                <ref_id>part_bom_1</ref_id>
              + <Relationships>
            </Item>
            - <Item type="qry_QueryItem">
                <alias>RelPart</alias>
                <condition_ref_id/>
  715c        <item_type type="ItemType" name="Part"
                    keyed_name="Part">4F1AC04A2B484F3ABA4E20DB63808A88</item_type>
                <ref_id>part_2</ref_id>
              - <Relationships>
                  - <Item type="qry_QueryItemSelectProperty">
                       <property_ref_id>RelPart_ItemNumber_GUID</property_ref_id>
  720d             </Item>
                  <Relationships>
            </Item>
            - <Item type="qry_QueryReference">
                <child_ref_id>part_bom_1</child_ref_id>
                <condition_ref_id>join_cond_1</condition_ref_id>
  730a        <parent_ref_id>part_1</parent_ref_id>
                <ref_id>qref_1<ref_id>
            </Item>
            - <Item type="qry_QueryReference">
                <child_ref_id>part_2</child_ref_id>
                <condition_ref_id>join_cond_2</condition_ref_id>
  730b        <parent_ref_id>part_1</parent_ref_id>
                <ref_id>qref_2<ref_id>
            </Item>
            <Relationships>
        </Item>
    <AML>
```

FIG. 9

```
<Item type="qry_QueryDefinition" action="qry_ExecuteSimplifiedQueryDefinition">
  <Parameters>
    <parameter name="@PartNumber" type="string" value="IN-00001" />
  </Parameters>
  <Relationships>
    <Item type="Part" qb:alias="Part" qb:select="id, item_number">
      <qb:filter>
        <eq>
          <property qb:alias="Part.item_number" />
          <parameter name="@PartNumber" />
        </eq>
      </qb:filter>
    </Item>
  </Relationships>
</Item>
```

FIG. 10

```
<Item type="qry_QueryDefinition"
 action="qry_ExecuteSimplifiedQueryDefinition">
  <Parameters>
    <parameter name="@Levels" type="integer" value="2" />
  </Parameters>
  <Relationships>
    <Item type="Part" qb:alias="Part" qb:select="id, item_number">
      <Relationships>
        <Item type="Part BOM" qb:alias="Part BOM" qb:select="id">
          <qb:fetch>
            <if>
              <condition>
                <match-path>
                  <parameter name="@ExecutionPath" />
                  <format-string format="QR1/(QR2/QR1){#0}/">
                    <argument-value key="#0">
                      <parameter name="@Levels" />
                    </argument-value>
                  </format-string>
                </match-path>
              </condition>
              <then>0</then>
            </if>
          </qb:fetch>
        </Item>
      </Relationships>
    </Item>
  </Relationships>
</Item>
```

```
<item type="TopPart">
  <created_by_id keyed_name="Innovator Admin">30B991F927274FA382965 5F50C99472E</created_by_id>
  <id keyed_name="part_5">84E0DD8289494 96DB5F86FBBA49E0F6D</id>
  <item_number>part_5</item_number>
</item>
<item type="TopPart">
  <created_by_id keyed_name="Innovator Admin">30B991F927274FA38296 55F50C99472E</created_by_id>
  <id keyed_name="part_6">ABFD8D198363 4E59A2E686CF1C1610E4D</id>
  <item_number>part_6</item_number>
</item>
<item type="TopPart">
  <created_by_id keyed_name="Innovator Admin">30B991F927274FA38296 55F50C99472E</created_by_id>
  <id keyed_name="part_7">D68CFA6BB8424 AFD98849DF99619DD35</id>
  <item_number>part_7</item_number>
</item>
<item type="TopPart">
  <created_by_id keyed_name="Innovator Admin">30B991F927274FA38296 55F50C99472E</created_by_id>
  <id keyed_name="part_8">654865D4E35143F1 A372B4B477D6A656</id>
  <item_number>part_8</item_number>
</item>
</Result>
</SOAP-ENV:Body>
</SOAP-ENV:Envelope>
```

```xml
1400

<AML>
<Item alias="Part">
    <id>ROOT_PART_ID</id>
    <Relationships>
        <Item alias="Part BOM">
            <id>PB_1</id>
            <Relationships>
                <Item alias="Part">
                    <id>REUSED_PART_ID</id>
                </Item>
            </Relationships>
        </Item>
        <Item alias="Part BOM">
            <id>PB_2</id>
            <Relationships>
                <Item alias="Part">
                    <id>REUSED_PART_ID</id>
                </Item>
            </Relationships>
        </Item>
        <Item alias="Part BOM">
            <id>PB_3</id>
            <Relationships>
                <Item alias="Part">
                    <id>NON_REUSED_PART_ID</id>
                    <Relationships>
                        <Item alias="Part BOM">
                            <id>PB_4</id>
                            <Relationships>
                                <Item alias="Part">
                                    <id>REUSED_PART_ID</id>
                                    <Relationships>
                                        <Item alias="Part Document">      ⎫
                                            <id>PD_1</id>                  |
                                        </Item>                            |
                                    </Relationships>                       |
                                </Item>                                    ⎬ 1405
                            </Relationships>                               |
                        </Item>                                            |
                    </Relationships>                                       |
                </Item>                                                    ⎭
            </Relationships>
        </Item>
    </Relationships>
</Item>
</AML>
```

```xml
<Result>
    <Item alias="Part">
        <id>ROOT_PART_ID</id>
        <QB_flat_id>0</QB_flat_id>
        <QB_flat_parent_ids></QB_flat_parent_ids>
    </Item>
    <Item alias="Part BOM">
        <id>PB_1</id>
        <QB_flat_id>1</QB_flat_id>
        <QB_flat_parent_ids>0</QB_flat_parent_ids>
    </Item>
    <Item alias="Part BOM">
        <id>PB_2</id>
        <QB_flat_id>2</QB_flat_id>
        <QB_flat_parent_ids>0</QB_flat_parent_ids>
    </Item>
    <Item alias="Part BOM">
        <id>PB_3</id>
        <QB_flat_id>3</QB_flat_id>
        <QB_flat_parent_ids>0</QB_flat_parent_ids>
    </Item>
    <Item alias="Part">
        <id>REUSED_PART_ID</id>
        <QB_flat_id>4</QB_flat_id>
        <QB_flat_parent_ids>1,2</QB_flat_parent_ids>
    </Item>
    <Item alias="Part">
        <id>NON_REUSED_PART_ID</id>
        <QB_flat_id>5</QB_flat_id>
        <QB_flat_parent_ids>3</QB_flat_parent_ids>
    </Item>
    <Item alias="Part BOM">
        <id>PB_4</id>
        <QB_flat_id>6</QB_flat_id>
        <QB_flat_parent_ids>5</QB_flat_parent_ids>
    </Item>
    <Item alias="Part">
        <id>REUSED_PART_ID</id>
        <QB_flat_id>7</QB_flat_id>
        <QB_flat_parent_ids>6</QB_flat_parent_ids>
    </Item>
    <Item alias="Part Document">
        <id>PD_1</id>
        <QB_flat_id>8</QB_flat_id>
        <QB_flat_parent_ids>7</QB_flat_parent_ids>
    </Item>
</Result>
```

Domain Example: Query Definition

Domain Example: Sample Data

Domain Example: Query Execution Results Tree for context item = "Project1"

Domain Example: Query Execution Results Tree for context item = "Project2"

Domain Example: Derived Relationships

Domain Example: Domains and Subdomains

Domain Example: Dynamic Domain Membership

Domain Access Control Domain Team

Subdomain AC Policy Decision Table

Subdomain AC Policy Example

SYSTEM AND METHOD FOR IMPLEMENTING DOMAIN BASED ACCESS CONTROL ON QUERIES OF A SELF-DESCRIBING DATA SYSTEM

RELATED APPLICATIONS

This application claims priority to U.S. Provisional Application No. 62/664,557 filed Apr. 30, 2018 titled "System and Method for Implementing Domain Based Access Control of Queries of a Self-Describing Data System," which is hereby incorporated by reference in its entirety for all purposes.

TECHNICAL FIELD

This disclosure relates generally to data security. More specifically, this disclosure relates to a system and method for implementing domain based access control on queries of a self-describing data system.

BACKGROUND

The technical challenges associated with implementing a search, or query functionality on data expressed in certain markup languages and stored in a database, in particular, a relational database, such as a .SQL server database include, without limitation, difficulty in formulating and executing recursive search queries as well as searching across a dynamic data model. Specifically, recursive searches of relational databases require iterative and repetitive reformulation of the search query. Further, certain markup languages do not support query functionality over across dynamic data models, as changes to the data model will block the execution of the search, typically resulting in an error message indicating that the database schema is different than an expected schema.

SUMMARY

This disclosure provides a system and method for implementing domain based access control on queries in a self-describing data system.

In a first embodiment, a method for implementing access controls of searches for items of data belonging to a self-describing data structure include obtaining a query definition specifying a requested item of data in the self-describing data structure. The method also includes determining one or more domains associated with the requested item, the one or more domains including a set of items within the self-describing data structure on an execution path of a query executed according to the query definition. The method also includes, for each respective domain of the one or more domains associated with the requested item: (i) determining one or more subdomains associated with the requested item, wherein the one or more subdomains are located in the respective domain, (ii) determining a role of the user for the respective domain, wherein the role is associated with a set of access permissions to items of data within the domain, and (iii) generating an output corresponding to whether access to the requested item is granted based on a policy for each of the one or more subdomains associated with the requested item and the role of the user for the domain.

In a second embodiment, a tangible, non-transitory computer-readable medium storing instructions that, when executed, cause one or more processing devices to obtain a query definition specifying a requested item of data in a self-describing data structure. The processing devices further to determine one or more domains associated with the requested item, the one or more domains including a set of items within the self-describing data structure on an execution path of a query executed according to the query definition. For each respective domain of the one or more domains associated with the requested item, the processing devices further to: (i) determine one or more subdomains associated with the requested item, wherein the one or more subdomains are located in the respective domain, (ii) determine a role of the user for the respective domain, wherein the role is associated with a set of access permissions to items of data within the domain, and (iii) generate an output corresponding to whether access to the requested item is granted based on a policy for each of the one or more subdomains associated with the requested item and the role of the user for the domain.

In a third embodiment, a system includes a memory device storing instructions, and a processing device operatively coupled to the memory device, the processing device to execute the instructions to obtain a query definition specifying a requested item of data in a self-describing data structure. The processing device further to determine one or more domains associated with the requested item, the one or more domains including a set of items within the self-describing data structure on an execution path of a query executed according to the query definition. For each respective domain of the one or more domains associated with the requested item, the processing device further to (i) determine one or more subdomains associated with the requested item, wherein the one or more subdomains are located in the respective domain, (ii) determine a role of the user for the respective domain, wherein the role is associated with a set of access permissions to items of data within the domain, and (iii) generate an output corresponding to whether access to the requested item is granted based on a policy for each of the one or more subdomains associated with the requested item and the role of the user for the domain.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C"

includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of this disclosure and its advantages, reference is now made to the following description, taken in conjunction with the accompanying drawings, in which:

FIG. 1 illustrates an example of a tag creating an instance of an item in a self-describing data system according to various embodiments of this disclosure;

FIG. 3 illustrates an example of a configuration document for an item according to certain embodiments of this disclosure;

FIGS. 7A and 7B illustrate an example of a configuration document setting forth the configuration of a query based on a self-describing data model according to certain embodiments of this disclosure;

FIG. 9 illustrates an example of a query configuration document comprising an instance of an item belonging to the query parameter item type which provides a user-defined filter on the query response data set;

FIG. 10 illustrates an embodiment of a query configuration document comprising an instance of an item belonging to the query parameter item type;

FIGS. 12A and 12B illustrate an example of a markup language document comprising query results obtained and outputted according to various embodiments of this disclosure;

FIGS. 14A and 14B illustrate query results outputted according to embodiments of this disclosure;

FIG. 28 illustrates an implementation of domain access controls using derived relationships according to some embodiments of this disclosure.

DETAILED DESCRIPTION

Figure 2:
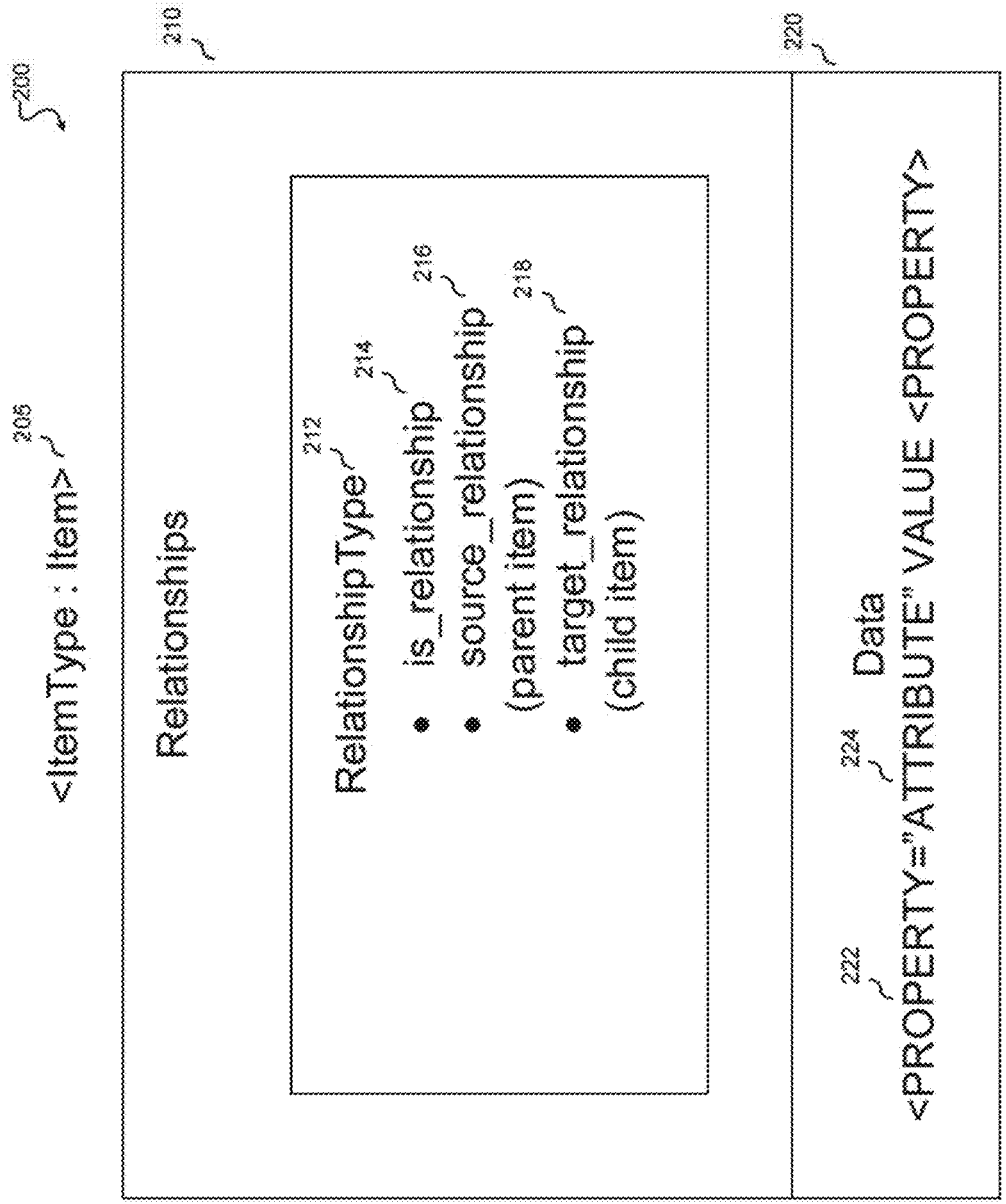
FIG. 2 illustrates, at a structural level aspects of the configuration of an item in a self-describing data system according to various embodiments of this disclosure.

FIGS. 1 through 26, discussed below, and the various embodiments used to describe the principles of this disclosure in this patent document are by way of illustration only and should not be construed in any way to limit the scope of the disclosure. Those skilled in the art will understand that the principles of this disclosure may be implemented in any suitably arranged wireless communication system.

FIG. 1 illustrates an example of an <item> tag 100 defining an instance of an item in a self-describing data system according to various embodiments of this disclosure.

According to certain embodiments, the foundational element of a self-describing data system is an item, instances of which may be maintained in persistent storage in a relational database. According to certain embodiments, the configuration and properties of an item may be expressed in a markup language, such as extensible markup language (XML), or Aras Markup Language (AML), which, as described in greater detail herein, follows a repeating "/Item/Relationships/Item/Relationships" pattern to describe item configurations.

Further, in the non-limiting example of FIG. 1, <item> tag 100 defines an instance of an item, which is in turn, an instance of an ItemType, which is itself an item. In this way, the instance of an item defined by <item> tag 100 belongs to a self-describing data system. Further, in some embodiments each ItemType has a relational table in the database, whose columns map to the property names of the ItemType.

According to various embodiments, the instance of the item defined by <item> tag 100 comprises three principal attributes, a type 105, an ID 110 and an action 115. It should be noted that the following three attributes are not the only attributes which can be applied to an item.

In the non-limiting example shown in FIG. 1, type 105 comprises an ItemType name for the instance of the item defined by <item> tag 100. According to certain embodiments, type 105 expresses an ItemType name for the item defined by <item> tag 100. In the non-limiting example of FIG. 1, the name of the item type is the string "Part." According to various embodiments, the namespace for the "type" attribute is extensible and can be dynamically changed, as new names for ItemTypes become necessary. For example, in some embodiments, the item defined by <item> tag 100 may be a piece of data associated with a manufacturing process. In such cases, additional names for ItemTypes, such as "BOM" (Bill of Materials) may become necessary.

According to various embodiments, ID 110 comprises a unique identifier for the instance of an item created by <item> tag 100. In the non-limiting example of FIG. 1, ID 110 comprises the string "ABCDEF012345." According to certain embodiments, ID 110 provides, without limitation, a primary key for the instance of the item for the purposes of providing query results.

In some embodiments, action 115 comprises a method to be applied to the instance of an item defined by <item> tag 100. In the non-limiting example of FIG. 1, the method specified by action 115 is a "get." The instance of an item type defined by <item> tag 100 may, in some embodiments, include one or more Relationship tags, from which a query may be constructed. According to various embodiments, the methods specified by action 115 may be implemented by an API, for example, an API implementing the Aras Innovator Object Model or Item Object Model.

FIG. 2 illustrates, at a structural level, aspects of the configuration 200 of an item in a self-describing data system according to various embodiments of this disclosure.

Referring to the non-limiting example of FIG. 2, the item described by configuration 200 may be initially defined by an <item> tag 205, which according to various embodiments, embodies the syntax and three principal attributes of <item> tag 100 shown in FIG. 1.

According to certain embodiments, the configuration 200 of an item may be expressed as a markup language document (for example, an AML document). In some embodiments, item 200's configuration may be expressed through an "/Item/Relationships/Item/Relationships" pattern in an AML document. Further, the document expressing the configuration 200 of the item may contain data 220 (which are themselves, items), structure or relationships 210 (which are hierarchical items) and logic, which, as shown in the example of FIG. 1, may be expressed through an action attribute (for example, action 115 shown in FIG. 1) of each item.

In the non-limiting example of FIG. 2, relationships 210 comprise hierarchical items. According to certain embodiments, an item's relationship to one or more other items may be expressed through a RelationshipType item 212. In some embodiments, wherein the document setting forth an item's configuration is written in AML, an instance of a RelationshipType item may be defined by using the <Relationships> tag, which is a container tag holding a set of relationship items.

As shown in FIG. 2, according to certain embodiments, the set of relationship items may comprise one or more of the following three properties, an is_relationship 214, a source_relationship 216 and a target_relationship 218.

In some embodiments, when the RelationshipType 212 is created, is_relationship 214 is also created. Is_relationship 214 comprises an item, and its id is the value of the relationship_id property of RelationshipType 212. As such, is_relationship 214 operates to provide an ItemType pairing to RelationshipType 212, and to define a RelationshipType rule and an ItemType for storing the source_relationship 216 and target_relationship 218 properties of the RelationshipType item 212.

According to certain embodiments, source_relationship 216 is a property of RelationshipType 212 which comprises a link pointing to a child item. Similarly, target_relationship 218 is a property of RelationshipType 212, which comprises a link to a child item.

As shown in the non-limiting example of FIG. 2, the configuration 200 of an item may further comprise data 220 expressed as values of properties, wherein the properties may further be specified by attributes.

According to certain embodiments, a property 222 defines data for an item. Examples of properties may include, for example, a cost for an item, which could be expressed in AML or XML in the form: "<cost>232.13</cost>" indicating that a particular item has a cost value of "232.13" units.

According to certain embodiments, items of data for an item may be further specified with an attribute 224, which may be analogized as metadata for the item or property, and controlling logic and methods associated with the item. For example, an attribute may define a conditional, producing an AML or XML expression of the form "<cost condition="between">10.00 and 50.00</cost>" In this example, the property "cost" is further specified through the "between" attribute for which the values 10.00 and 50.00 are specified.

According to certain embodiments, the configuration 200 for an item may further include history data for the item, showing some or all of the previous configurations of the item.

FIG. 3 illustrates an example of a configuration document 300 for an item according to certain embodiments of this disclosure. As shown in the non-limiting example of FIG. 3, an instance of an ItemType is declared through an initial <item> tag 305, which specifies that this instance of an item is of the "Part" type and is associated with an "add" method.

The properties 310 of the item are set forth, and include an "item_number" value (which, according to certain embodiments, may function as a unique identifier of the instance of the item) and a "description" value, which, in this case is "Some Assy" (an abbreviation of "some assembly.")

Container tag 315 specifies that the item has relationships, including a first relationship 320 with item indicating an "add" method with an item of the type "Part BOM." Item configuration 300 further specifies a "related_id" (e.g., child relationship between the "Part BOM" item and a child "part" item 325. Thus, by applying the "/Item/Relationships/Item/Relationships" pattern, a part-to-part BOM relationship may be described.

Figure 4:
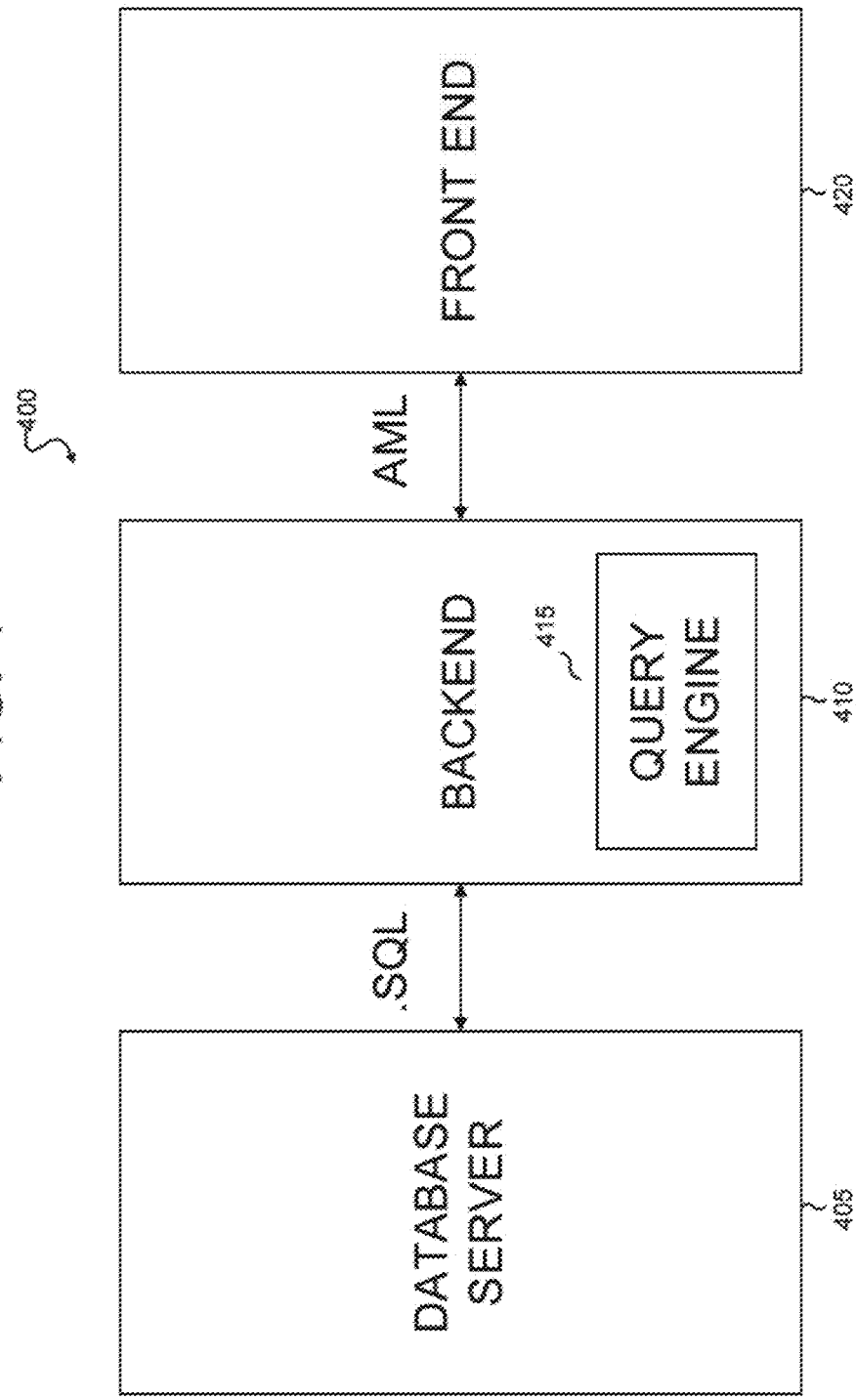
FIG. 4 illustrates an example of a system architecture for implementing a query engine for performing recursive searches in a self-describing data system according to various embodiments of this disclosure.

FIG. 4 illustrates an example of a system architecture 400 for implementing a query engine for performing recursive searches in a self-describing data system according to certain embodiments of this disclosure. In the non-limiting example of FIG. 4, network architecture comprises a database server 405, a backend server 410 implementing query engine 415, and a front end 420.

According to certain embodiments, database server 405 is a server hosting data and implementing one or more database applications supporting query functionalities. Database server 405 is generally platform-agnostic and may host data in a number of known database formats, including a relational database format (for example, by running an instance of .SQL server) or as a columnar database format. In the non-limiting example of FIG. 4, database server 405 is communicatively connected to backend 410. In some embodiments, this connection is provided over a network link, and in some other embodiments, backend 410 and database server 405 may be embodied on the same piece of hardware. Skilled artisans will appreciate that embodiments according to this disclosure may be implemented on a variety of hardware platforms.

According to certain embodiments, database server 405 is configured to receive queries expressed as statements in a domain-specific language (for example, structured query language), and return results from the database hosted on database server 405.

According to certain embodiments, backend 410 comprises a server or other computer configured to implement a query engine 415 configured to receive, from front end 420 query requests expressed in the syntax of a self-describing data system (for example, AML). As noted elsewhere, embodiments according to this disclosure are platform-agnostic and may be practiced across a wide range of hardware configurations and development environments. In some embodiments, query engine 415 may be implemented as an ASP.NET web service.

In the non-limiting example of FIG. 4, front end 420 is communicatively connected (for example, via a network or being embodied on the same piece of hardware) to backend 410. According to certain embodiments, front end 420 comprises a web client of a web service provided by backend 410, and provides a user interface (UI) through which queries can be input and query outputs displayed as a user. In certain embodiments, front end 420 may be constructed using modules from the HTML 5 DOJO toolkit. According to certain further embodiments, front end 420 may provide an interface through which users can configure parameters of queries and set permissions for queries.

Figure 5:
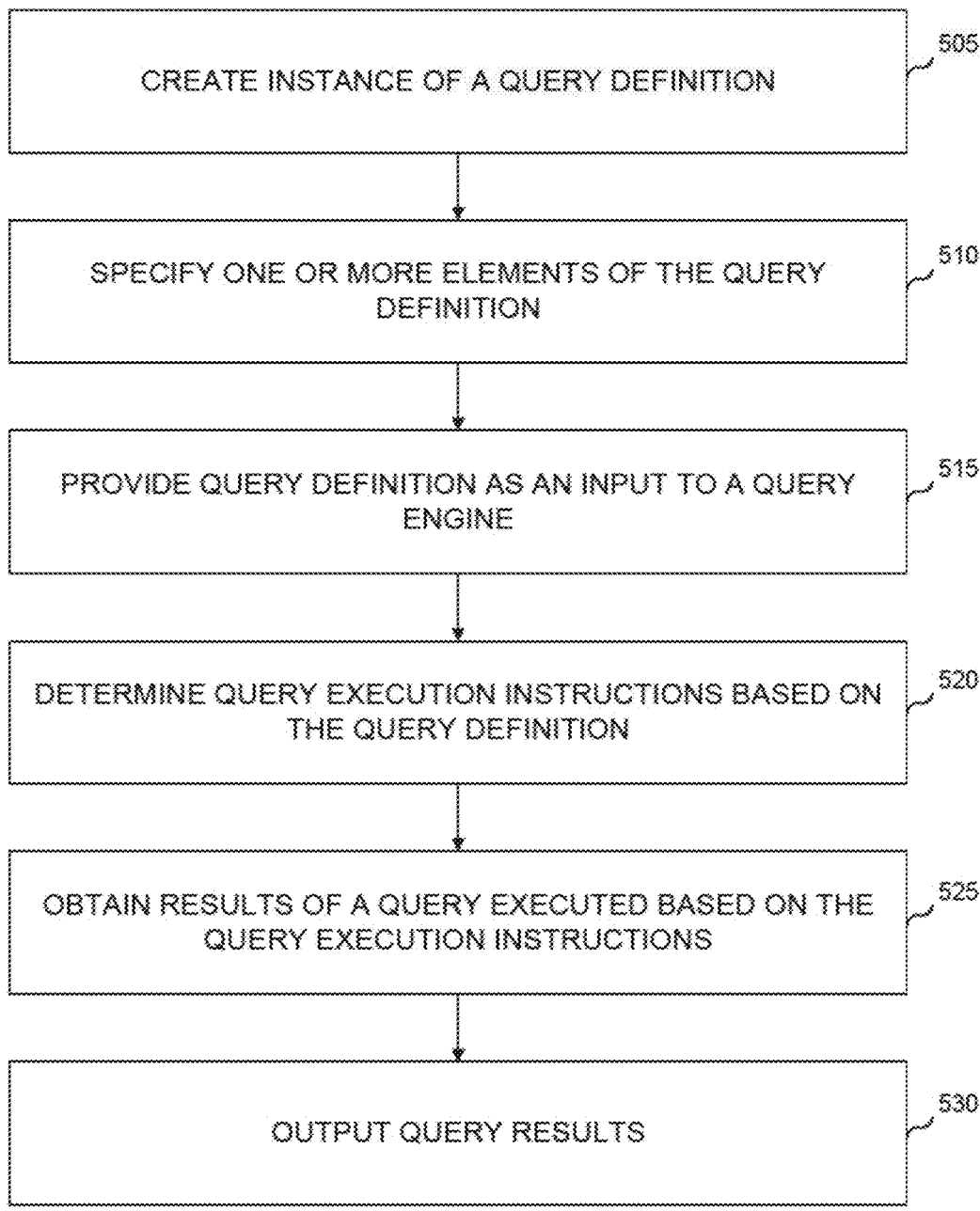
FIG. 5 illustrates operations of a query engine in one embodiment of a method for performing recursive searches in a self-describing data system.

FIG. 5 illustrates operations of a query engine in an example of a method 500 for performing recursive searches in a self-describing data system according to embodiments of this disclosure.

According to the non-limiting example of FIG. 5, method 500 includes operation 505, wherein the query engine creates an instance of a query definition. As discussed elsewhere in this disclosure, certain embodiments according to this disclosure utilize a self-describing data system, wherein the fundamental element of the data system is the item, which is an instance of an ItemType, which is, in turn, itself an item. Further, in certain self-describing data systems according to this disclosure, the configuration of items may be expressed through an "/Item/Relationships/Item/Relationships" pattern.

In some embodiments, a query definition is an item, and creating an instance of a query definition at operation 505 comprises beginning a markup language document (for example, an AML document) defining the configuration of the query definition. Further, a query definition may define the set of data (otherwise known as a domain) which a user is interested in seeing, and which can be collected across one or more different items types and/or relationships using user specified rules for filtering. Because a query definition defines the domain of a query, it may also be utilized to implement domain-based access controls to data items within the data structure.

According to certain embodiments, the AML document defining the configuration of the query begins with an instance of an <item> tag, an example of which is provided below:

<Item action="qry_Execute QueryDefinition" type="qry_QueryDefinition">

As shown above, according to some embodiments, an <item> tag creating an instance of a query definition specifies, at a minimum, a type of the instance of the query, which in this case, is a query definition (specified as "qry_QueryDefinition"), and a method, or action associated with the item, which in this case, is an instruction to execute a query, (specified as "qry_Execute Query Definition"). In some embodiments, the <item> tag creating the instance of the query definition item may further comprise a unique ID for the item, which in certain embodiments, may be advantageous if queries or query histories are stored in the data structure.

As shown in the non-limiting example of FIG. 5, method 500 includes operation 505, wherein the query builder, in response to a user input, specifies one or more elements of the query definition. According to certain embodiments, the one or more specified elements of the query definition may be specified as relationships, properties or attributes within the document providing the configuration of the query definition. Specifically, the one or more elements may be specified through additional items defining relationships or properties, including, without limitation, query items, query item selection properties, query item sort properties, query item available properties, query condition items and query reference items.

According to certain embodiments, method 500 includes operation 515, wherein the query definition is provided to a query engine. According to some embodiments, operations 505 and/or 510 may variously be performed at a front end client (for example, front end 420 shown in FIG. 4). According to other embodiments, operations 505 and/or 510 may be performed at the back end or programmatically at the query engine itself. According to certain embodiments, the query engine (for example, query engine 415 in FIG. 4) facilitates translating commands from a front end into query definitions, which are then converted into execution instructions to be passed to a database server (for example, database server 405 in FIG. 4). The query engine may further facilitate the construction of query definitions, and the provision of query results from the database server to the front end.

In some embodiments, method 500 also includes operation 520, wherein the query engine determines query execution instructions based on the received query definition. In the non-limiting example of FIG. 5, operation 520 comprises reading the query definition and translating it into a series of statements in the native language of the database server (for example, .SQL) and properly handling parameters defined within the query definition. As will be discussed further in this disclosure, as part of operation 520, the query engine may further specify an execution path for the query, as well as, where appropriate, recursion depths for recursive queries. In certain embodiments, the query execution instructions based on the query definition specify a recursive, level-by-level search of the data.

Additionally, in the non-limiting example of FIG. 5, the query execution instructions determined at operation 520 may be required to satisfy certain operational constraints, including without limitation, the ability to query a recursive structure, wherein a top level item is filtered by condition, while items from other levels are not filtered. Further, according to certain embodiments, querying a recursive structure must be performed without adding a "pseudo" top level item. Additionally, in certain embodiments, the execution instructions must enable a query of a recursive structure, wherein some intermediate level is filtered by a condition. Additionally, in some still further embodiments, the query execution instructions must enable limiting the depth of the retrieved structure, without modification of a recursive query topology.

According to various embodiments, at operation 525, the query engine obtains the results of a query executed based on the query execution instructions. According to certain embodiments, the results obtained at operation 525 may comprise generally unformatted data, and the query engine may assemble a response containing the results of the query.

In some embodiments, at operation 530, the query engine outputs the assembled query results. According to certain embodiments, operation 530 comprises returning the query response back to a user or application from which the request for a query was received (for example, front end 420 in FIG. 4). According to certain embodiments, the query results output at operation 530 may comprise a markup language document (for example, a document in XML, AML or some other extensible markup language dialect). According to other embodiments, at operation 530, the query engine may output query results as a flat output, a tree graph view or a graph visualization.

Figure 6:
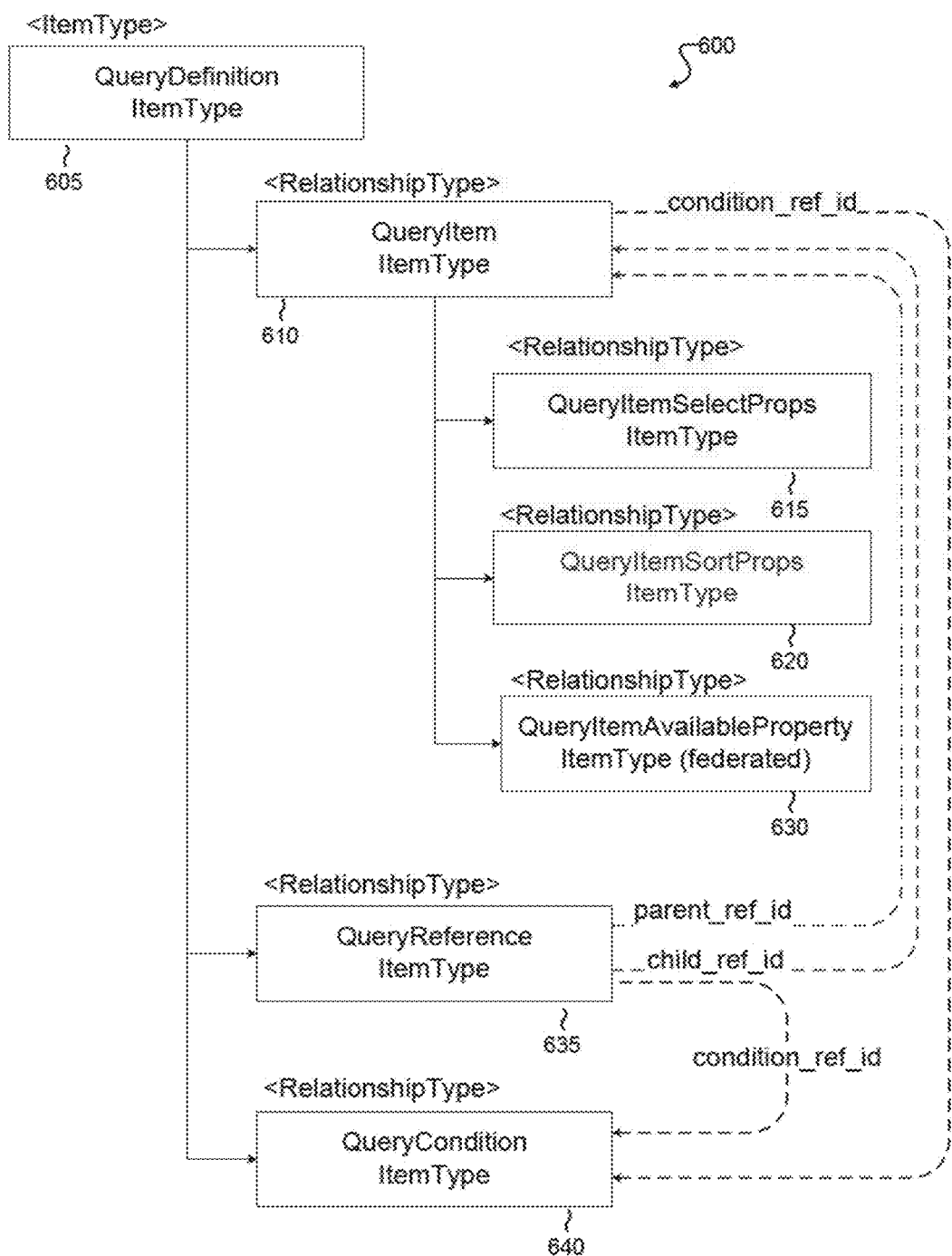
FIG. 6 illustrates, at a structural level, one example of a data model supporting a query definition item according to embodiments of this disclosure.

FIG. 6 illustrates, at a structural level, one example of a data model 600 supporting a query definition item according to embodiments of this disclosure. Note that, in this particular example, data model 600 comprises a hierarchical, tree like structure.

As shown in the non-limiting example of FIG. 6, data model 600 includes a query definition item 605, which occupies the top, or root level of the specified elements used to define a query. According to certain embodiments, query definition item 605 is an item of the "Query Definition" item type. Query Definition item 605 defines the set of data a user is interested in seeing. The data belonging to this set can be collected across one or more different Item Types using rules for filtering. Additionally, access controls can be implemented by defining additional filters excluding certain users from accessing (by including within the set of data encompassed by the user's query) data. According to certain embodiments, the properties of query definition item comprise a name, which can be a string specifying a unique name for the query definition. Additionally, the properties of query definition 605 can include a description, which can be a string or text describing the type of data represented by the query definition. Still further, the properties of the query definition can include a root query item id, which comprises a string representing the context item (also referred to as a root of the tree structure of data model 600) for query definition data model 600. According to other embodiments, properties of the query definition may include, without limitation, permissions.

According to certain embodiments, data model 600 is a self-describing data model which follows an "/Item/Relationship/Item/Relationship" description structure. Accordingly, in data model 600, a federated set of relationship properties 610 through 640 follow query definition 605. These relationships include query item 610. According to certain embodiments, query item 610 may appear as one or more <item> tags within a <relationship> container, such as shown in the example given in FIG. 3. Query item 610 is an item representing the source for properties, including properties to be selected and returned as part of the query response, and joins and filtering to be used, in the query definition. According to certain embodiments, the properties included in query item 610 include, without limitation, those set forth in Table 1 below:

TABLE 1

| Name | Label | Type | Description |
| --- | --- | --- | --- |
| classification | Classification | | Aggregation (GroupBy, SUM, AVG) Union Intersection Special Join |
| itemtype | ItemType | Item | ItemType which is described by Query Item (Item or Relationship) |
| Alias | Alias | String | Alias of Query Item which will be used in joins and conditions. |
| condition_ref_id | Referenced Condition | String | Referenced Query Condition. |
| ref_id | Reference ID | String | Reference ID of Query Item |

As shown in the non-limiting example of FIG. 5, query item 610 may have source and target relationships (such as described with respect to relationships 210 in FIG. 2) with other relationships within data model 600. For example, query item 610 may have both a parent and a child relationship with a query reference 635. Similarly, query item 610 may also be indicated as either the source or the target of a relationship with query condition 640.

According to certain embodiments, the relationships specified by data model 600 comprise query item selection properties 615, which define or identify which properties from query item 610 to include in the query response. An overview of the properties in one example of query item selection properties 615 is set forth in Table 2, below:

TABLE 2

| Name | Label | Type | Description |
| --- | --- | --- | --- |
| property_ref_id | Property | String | Reference to qry_QueryItemAvailableProperty via ref_id value. |

In some embodiments, the relationships specified by data model comprise query item sort properties 620, which define which properties from the associated query item are to be used for sorting data returned by the query, and how the sort is to be performed. An overview of properties of query item sort properties 620 is set forth in Table 3, below:

TABLE 3

| Name | Label | Type | Description |
| --- | --- | --- | --- |
| property_ref_id | Property | String | Reference to qry_QueryItemAvailableProperty via ref_id value. |
| sort_order | Sort Order | Integer | Order of sorting |
| sort_order_direction | Sort Order Direction | List | Values: Ascending, Descending |

According to various embodiments, the relationships specified by data model 600 further comprise query item available properties 630. In the non-limiting example of FIG. 6, query item available properties 630 define which federated properties from the associated query item to include in the query response. An overview of properties of query item available properties 630 is set forth in Table 4, below:

TABLE 4

| Name | Label | Type | Description |
| --- | --- | --- | --- |
| source_id | | Item (qry QueryItem) | Reference to qry_QueryItem |
| name | Name | String | |
| label | Label | ML String | |
| type | Type | List | Data Type of the QueryItem property |
| ref_id | Reference ID | String | Reference ID (GUID) |

In the non-limiting example of FIG. 6, the relationships specified data model 600 further comprise query reference 635, which, like the other relationships shown in FIG. 6, may be expressed as an instance of an item within the <relationship> container tag. According to certain embodiments, query reference 635 defines join requirements between query items within the query definition, and as such, implements controls over how data is collected and aggregated across query items within the query definition which have relationships with one another. In some embodiments, query reference 635 operates to specify relationships between query items in an analogous manner as relationships 212 in FIG. 2. An overview of properties of query reference 635 is set forth in TABLE 5, below:

TABLE 5

| Name | Label | Type | Description |
| --- | --- | --- | --- |
| parent_ref_id | Parent Item | String | Referenced parent Query Item. |
| child_ref_id | Child Item | String | Referenced child Query Item. |
| condition_ref_id | Referenced Condition | String | Referenced Query Condition. |

According to certain embodiments, the relationships specified within query definition data model 600 comprise query condition 640. Query condition 640 is an instance of an item which defines the filter conditions for the data request. According to certain embodiments, the scope of query condition 640 is the entity on which it is referenced, and a query condition can be optionally associated with a query item and query reference items. In the case where query condition 640 is referenced by a query item (for example, query item 610), then query condition filters the items defined by the query item. If, however, the query condition is referenced by a query reference (for example, query reference 635), it operates to filter the items defined by a query item referenced as the child query item for the query reference. An overview of properties of query condition 640 is set forth in TABLE 6 below:

TABLE 6

| Name | Label | Type | Description |
| --- | --- | --- | --- |
| condition_xml | Condition Xml | Text | Xml representation of specified conditions. |
| ref_id | Reference ID | String | Reference ID of Query Condition. |

FIGS. 7A and 7B illustrate an example of a markup language configuration document 700 setting forth the configuration of a query constructed based on a self-describing data model (for example, data model 600 in FIG. 6) according to embodiments of this disclosure.

As shown in the non-limiting example of FIGS. 7A and 7B, configuration document 700 includes an <item> tag 705 creating an instance of the query definition, whose properties include the action or method "qry_ExecuteQueryDefinition."

Referring to the non-limiting example of FIGS. 7A and 7B, configuration document 700 further includes three query condition items 710a, 710b and 710c specifying filters to be applied in the query. In this particular example, the properties of each of query condition items 710a through 710c are further specified by attributes further controlling the execution logic of the query. For example, in query condition item 710, the <condition> attribute is used to define the filter, as shown by the statement "<![CDATA[<condition><eq><property ref-id="TopPart_id_GUID"/><property ref-id="PBom_sourceId_GUID"/></eq></condition>]]>".

Configuration document 700 further includes query items 715a, 715b and 715c which, set forth properties to be part of the query response, and the properties to be used in joins and filtering. For example, query item 715a specifies an item, having the name "part" and the attribute "keyed_name," with the value "4F1AC04A2B484F3ABA4E20DB63808A88" as a filter for items to be returned by the query.

In the non-limiting example of FIGS. 7A and 7B, query document 700 further comprises query item selection properties 720a, 720b, 720c and 720d, which variously specify properties from query items 715a and 715c to include in the query response. For example, query item selection property 720a specifies the property "TopPart_id" as a property to be returned with query response items satisfying the filter criterion "keyed_name" "4F1AC04A2B484F3ABA4E20DB63808A88" specified by query item 715a.

Additionally, in this illustrative example, query document 700 further comprises an instance 725 of a query item sort property. In the non-limiting example of FIGS. 7A and 7B, instance 725 of a query item sort property specifies "TopPart_name" as the property to sort the items in the query response, and instance 725 of query item sort property includes the attribute "sort_order_direction" whose value "Ascending" indicates that the query response items are to be sorted by "TopPart_name" in ascending order.

As shown in the non-limiting example of FIGS. 7A and 7B, query document 700 further includes query reference items 730a and 730b, which specify how, in executing the query, data is collected and aggregated across query items which have relationships with other query items within the query definition. In this particular example, query reference items 730a and 730b specify join requirements, as shown, for example, by the property "<condition_ref_id>join_cond_1</condition_ref_id>" in query reference item 730a.

Figure 8:
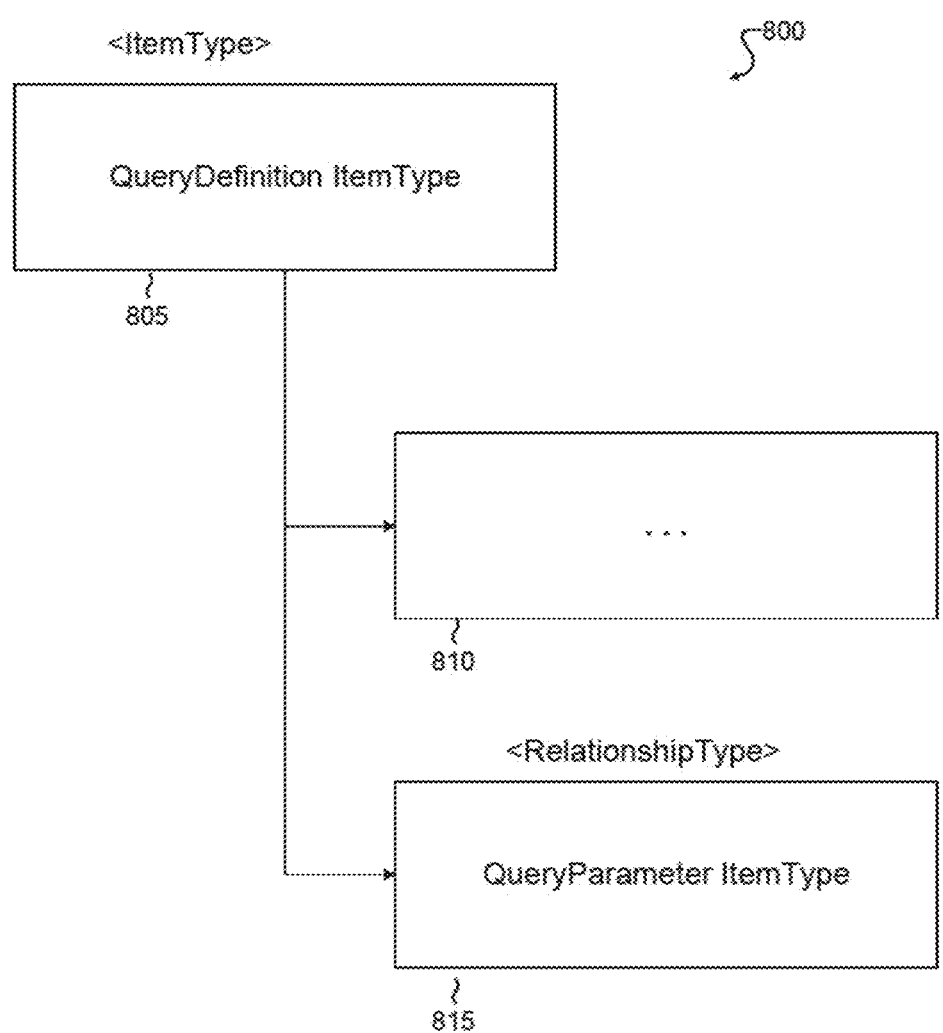
FIG. 8 at a structural level, an exemplary embodiment of an extension of a data model for configuring recursive searches of a self-describing data system.

FIG. 8 illustrates, at a structural level, an exemplary embodiment of an extension of a data model 800 for configuring recursive searches of a self-describing data system.

In the non-limiting example of FIG. 8, data model 800 is represented as having a hierarchical tree structure, with query definition item 805 as the root, or context item type. Further, according to certain embodiments, data model 800 represents a query in a self-describing data system, whose elements follow a regular "/Item/Relationship/Item/Relationship" pattern.

Data model 800 may, according to various embodiments, include a variety of types of items 810 specifying relationships within the query definition. These items may comprise, for example, items 610-640 in FIG. 6, or a subset or superset thereof. Additionally, according to certain embodiments, data model 800 may further comprise items 815 belonging to the query parameter item type. According to various embodiments, query parameters comprise a user-defined parameter within query conditions which can be supplied at query execution time to override default values. Additionally, query parameters may also be used in other assignable values within a query definition, such as in offset and fetch values. The values for the parameters specified within the query parameter item may then be assigned at the time the query definition is to be executed.

Additionally, items 815 belonging to the query parameter item type may also be utilized to track or control aspects of the execution of a query. For example, according to certain embodiments, a user designed parameter "@ExecutionPath" is a dynamic parameter which may be calculated while processing a query definition to determine the progress of a query. Additionally, according to certain embodiments, items 815 belonging to the query parameter item type may also be used to define a query execution path, reflecting a route from a parent query item to a child query item in a query definition. Still further, items 815 belonging to the query parameter item type may be used to control the depth (i.e., how many levels are traversed) of recursion of a recursive query. According to some embodiments, a query engine (for example, query engine 415 in FIG. 4) will, by default and in the absence of a query parameter item specifying otherwise, exhaustively traverse all recursive paths.

FIG. 9 illustrates an embodiment of a query configuration document 900 comprising an instance of an item 905 belonging to the query parameter item type which provides a user-defined filter on the query response data set. As shown in the non-limiting example of FIG. 9, the container tag 907 "<Parameters>" signals the creation of the user-defined parameter having the name "@PartNumber," and the value "IN-0001." Further, as shown in FIG. 9, the parameter "@PartNumber" is specified as a filtering property 910 of a query response data set.

FIG. 10 illustrates an embodiment of a query configuration document 1000 comprising an instance 1005 of items belonging to the query parameter item type, by which the execution path of the query, in particular, the query recursion depth, may be controlled by defining a condition dependent on a value of the query parameter item. As shown in the non-limiting example of FIG. 10, an instance 1005 of the query parameter item defines the parameter named "@Levels," as being of an integer type. Once defined, the "@Level" parameter, in conjunction with the "@ExecutionPath" parameter is used as a value in conditional 1010, which determines the depth of the recursive query defined by query configuration document 1000.

Figure 11:
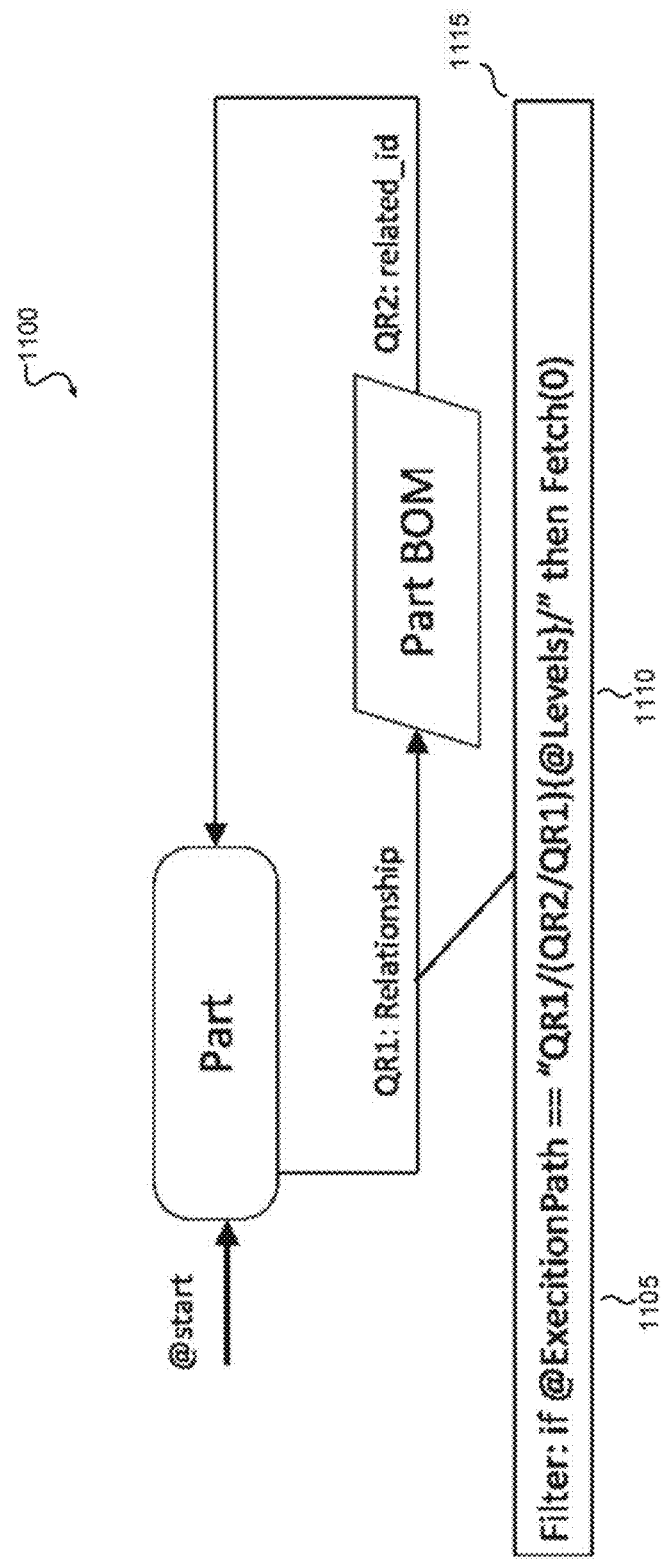
FIG. 11 illustrates, in wireframe format, an example of a query execution path for a query performed according to embodiments of this disclosure.

FIG. 11 illustrates, in wireframe format, a query execution path 1100 of a query (for example, the query described by query configuration document 1000 in FIG. 10). In the non-limiting example of FIG. 11, two items of the query parameter type are used to control query execution path. In this particular example, the first item 1105 of the query parameter type is the dynamic parameter "@ExecutionPath," and the second item 1110 of the query parameter type is the parameter "@Levels."

According to various embodiments, "@ExecutionPath" is a parameter calculated by a query execution engine (which according to certain embodiments, may be embodied as part of a query engine, such as, for example, query engine 415 in FIG. 4) tracking where the query execution engine is during the execution of a query definition. According to certain embodiments, query parameter "@ExecutionPath" is an item in a self-describing data system of the type "Path." In this particular example, the value of query parameter "@ExecutionPath" is a string reflecting a route from a parent query item (for example, query item 610 in FIG. 6) to a child query item via one or more query references (for example, query reference item 730a in FIG. 7).

In some embodiments, the query parameter "@Levels" is a parameter specifying the number of levels to "drill down" in a recursive search. Thus, in the example of FIG. 11, the execution path of the query, specifically, the items which are fetched while executing the query, is defined by the filter 1115 "if @ ExecutionPath "QR1/(QR2/QR1){@Levels/}/" then Fetch(0)." In this non-limiting example, if the value of the parameter "@Levels" is zero, then the query pulls no items, because/QR1(/(QR2/QR1){0}/ is equal to "/QR1/" limiting the path of the "Part" query to "Part BOM." If "@Levels"=1, then the query "drills down" one level and fetches the root "Part." If "@Levels"=2, then the query "drills down" two levels, fetching the root "Part" and its children. Similarly, if "@Levels"=3, then the query "drills down" three levels within the hierarchy of the data structure, fetching the root "Part", its children and their children.

After an execution engine implements execution instructions based on the query definition, query engines according to certain embodiments of this disclosure obtain the results of the executed query and output the query results.

Figure 12A:
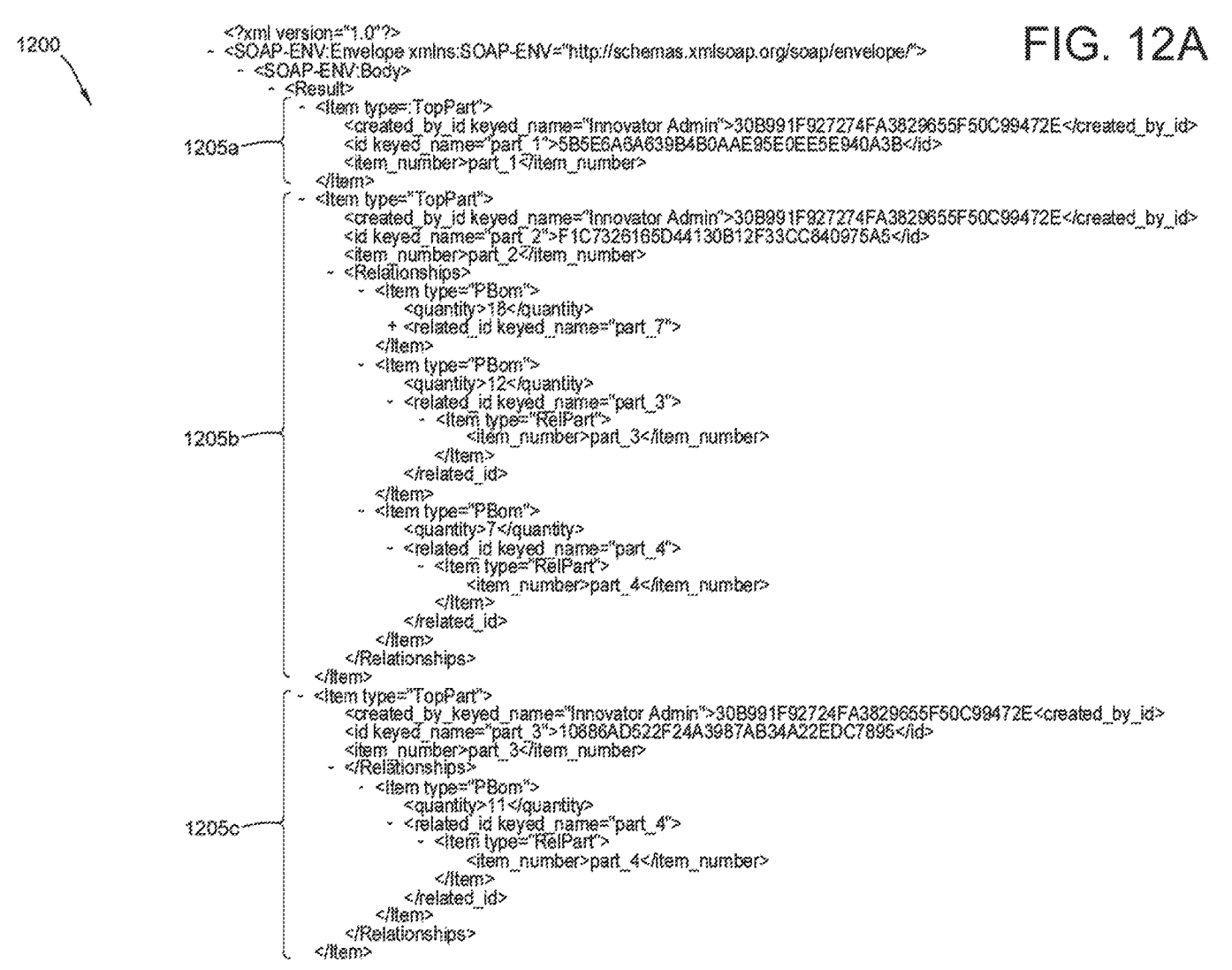

FIGS. 12A and 12B illustrate an example of a markup language document 1200 comprising query results obtained and outputted in a structured format. Specifically, markup language document 1200 comprises AML format results of the recursive query configured by query configuration document 700 shown in FIGS. 7A and 7B of this disclosure. According to certain embodiments, a query response, such as provided by document 1200 comprises the results of a query executed according to a query definition.

As shown in the non-limiting example of FIGS. 12A and 12B, query results 1200 mirror the "/Item/Relationship/Item/Relationship" structural pattern of the query definition and other documents constructed according to a self-describing data model. As shown in FIGS. 12A and 12B, the query returned results 1205a through 1205g, which, as specified by query item selection property 720c in FIG. 7 belong to the item type "Top Part." Further, as discussed elsewhere in this disclosure, in the absence of a query parameter item overriding a default recursion depth, the query was executed until a terminal node for each item in the query definition was reached, as shown by, for example, result 1205b.

According to certain embodiments, a query engine may output query results in a structured format, such as the structured format of the query definition (for example, as shown in FIGS. 12A and 12B) of this disclosure. According to certain other embodiments, the query engine may output results according to a different structural format, such as a graph visualization.

Figure 13:
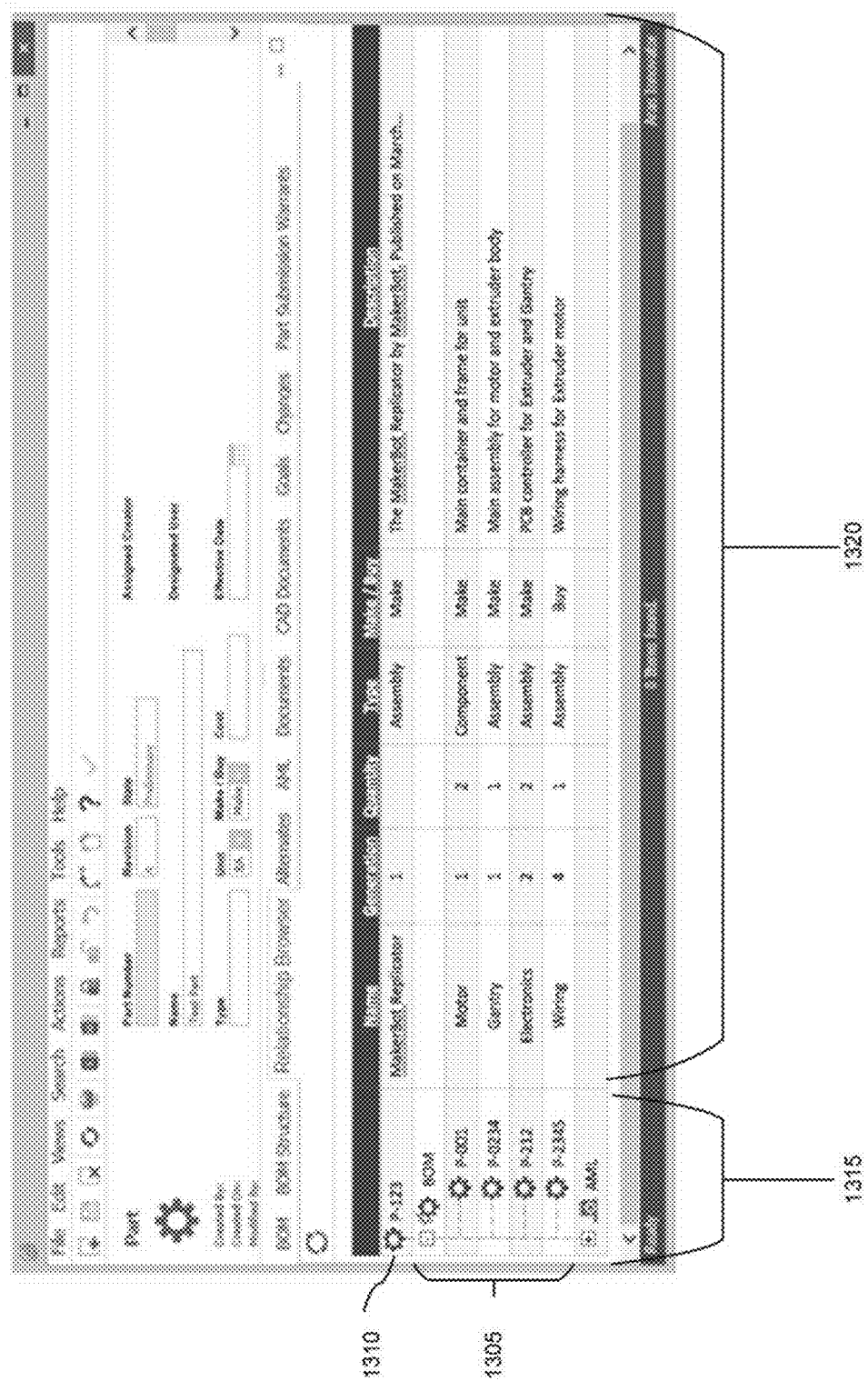
FIG. 13 illustrates query results output in a tree grid format according to various embodiments of this disclosure.

As shown by FIG. 13, a query engine according to certain embodiments of this disclosure may output query results in a tree grid format. In the non-limiting example of FIG. 13, a view 1300 of a user interface (such as presented by front end 420 in FIG. 4) showing query results 1305 in a tree grid view. According to embodiments, the tree grid view enables the query results to be displayed in a way that reflects the structure of the query definition by which they were obtained. As such, according to certain embodiments, query result items are displayed in a hierarchical manner reflecting their relationship to a context item, or root node, and which displays the relationship between items obtained by the executed query. In this particular example, query results 1305 are shown according to their relationship to context item, or root node "P-123," which in this example, corresponds to a "MakerBot Replicator." According to certain embodiments, the leftmost column 1315 of the tree grid view indicates hierarchical (i.e., parent-child relationship between the displayed items), while the columns to the right 1320 indicate properties of the items returned by the executed query.

According to certain embodiments or under certain conditions (for example, when performing very, very large queries, such as queries of a bill of materials for a helicopter, which when expressed as items in a self-describing data structure, may comprise a data structure with ~30,000,000 item nodes) the performance of the query engine may be improved by outputting the query results in a "flat" or unstructured format. In contrast to certain structured output formats according to embodiments of this disclosure, wherein the query results are outputted in a manner that reflects and allows reconstruction of, the hierarchy and relationships within the query structure and query execution path, a "flat" output may adhere to a simplified structure, wherein only "key properties" are displayed. In this way, the file size of the query result may be made more manageable.

FIG. 14A illustrates an example of a query result set 1400 of an executed query which has been output in a structured format, in this case AML. In this non-limiting example, a significant portion of the output 1405 is dedicated to </Relationship> container tags for expressing the hierarchy of relationships between items in the result set.

FIG. 14B illustrates an example of a query result set 1410 for the same query as in FIG. 14A, which has been output in a flat format with "id" defined as a key property of the output. Skilled artisans will appreciate that result set 1405 may be more readily processed than result set 1400 in the absence of an extended hierarchy defined by multiple </Relationship> container tags 1405. Further, according to certain embodiments, query result set 1400 may be readily converted into a structured result by calling the "qry_ConvertFlatToStructuredResult" method of the Aras IOM API.

While certain embodiments according to this disclosure primarily provide a search functionality for recursive searches of a self-describing data system by defining the domain of a query, determining execution instructions from the query definition, and then obtaining and outputting query results, the present disclosure is not so limited. By defining a domain in a data structure, certain embodiments of this disclosure leverage the ability to perform defined queries across self-describing data structures to dynamically define and update domains subject to defined access policies.

As discussed herein, in certain embodiments according to this disclosure, a query definition can specify the domain of a query, or the set of data items within a data structure on an execution path of a query (or plurality of queries) executed according to the query definition. Additionally, as discussed elsewhere in this disclosure, each item along the execution path may have properties and attributes, which are related to, or indicative of an item's sensitivity.

For example, in an enterprise which stores all of its data in a self-describing description according to this disclosure, there may be compelling organizational or security reasons to control distribution of financial data. Further, sensitive financial data may be stored as items of one or more item types (for example, an item type permitting values for "cost" or "profit." Similarly, users submitting queries for enterprise data may also have access rights. According to certain embodiments, these access rights may be specified via a user profile or a permissions set, which itself may be an item in a self-describing data system. Because a query definition may define the universe of items covered by a search, and the items within the search belong to specified item types, knowledge of a query domain can be leveraged to implement domain based access controls. That is, by knowing what types of items are covered by a query, and by setting permissions allowing certain users to only view certain item types, domain based access controls on items within the self-describing data structure may be implemented.

In some embodiments, domain based access control may refer to a form of relationship based access control where access rights for an item are determined based on the item relationships with other items in the self-describing data system. A domain may refer to a set of items that are related in a certain way to a special item referred to as a domain root. Examples of items (ItemTypes) that function as domain roots may include projects, programs, and/or products. The items that are included in a domain are determined based on their relationship with the domain root item for that domain. The relationships that define a domain are defined as a composition of "primary relationships" and "derived relationships", as explained further below. Executing the query defined by the query definition, the items of a domain may be retrieved when a domain root is provided as a context item.

In some embodiments, a mapping of the items membership in one or more subdomains of one or more domains may be maintained after the query of the query definition is executed. The mapping may be maintained in memory for quick access such that the query defined by the query definition is not re-executed. Incremental changes to data of items may be applied to the mapping in memory by adjusting the derived relationships of the items to the domain root when the data is modified.

In general, and as described further herein, a request may be received to query a requested item of data. A determination is made of what one or more domains to which the requested item belongs. For each of the one or more domains, a role of the user making the request is determined for the respective one or more domains. The subdomains to which the requested item belongs may also be determined. The subdomains may include policies for accessing the items and the policies may specify that different roles for the users have different access rights to items based on the state of the domain root with which the requested item is associated and/or a state of the subdomain item. If an output is generated that indicates the role of the user is to be granted access to the requested item in any of the subdomains of any of the domains, then the user is granted access to the requested item. In other words, the access rights that are output for the requested item in every subdomain and/or domain are combined to determine whether to provide access to the requested item.

Figure 15:
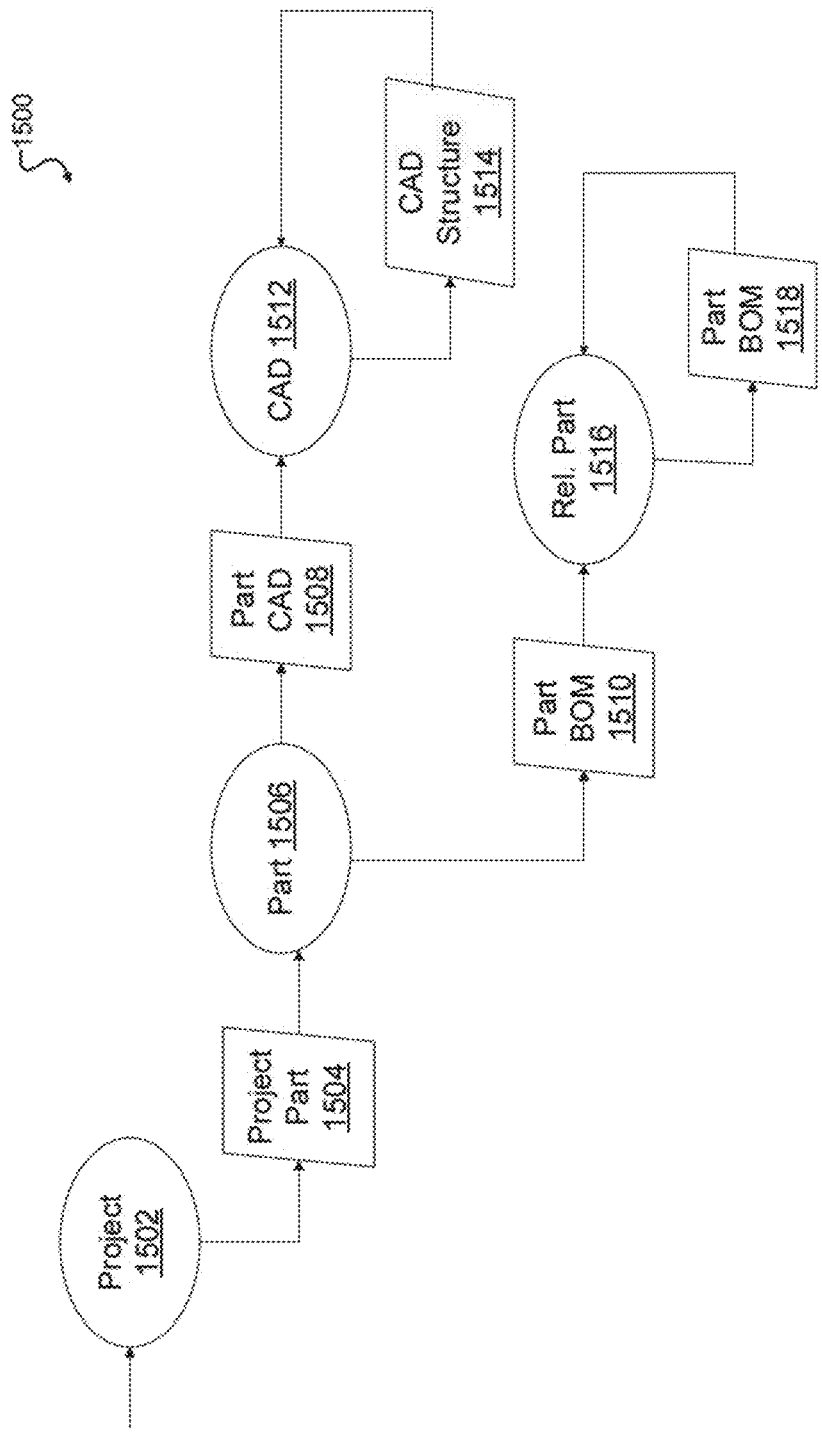
FIG. 15 illustrates an example query definition for Project domain items in graphic form according to embodiments of this disclosure.

FIG. 15 illustrates an example query definition 1500 for Project 1502 domain items in graphic form according to embodiments of this disclosure. As depicted, the query definition 1500 specifies the Project 1502 domain as the root domain. The items that are returned for the query definition 1500 for the Project 1502 domain include project part 1504, and part 1506. The part 1506 item may be associated with a part CAD 1508 and a part BOM 1510. The part CAD 1508 may be associated with a CAD 1512 that is associated with a CAD structure 1514. The part BOM 1510 may be associated with a relative part 1516 that is associated with another part BOM 1518.

Figure 16:
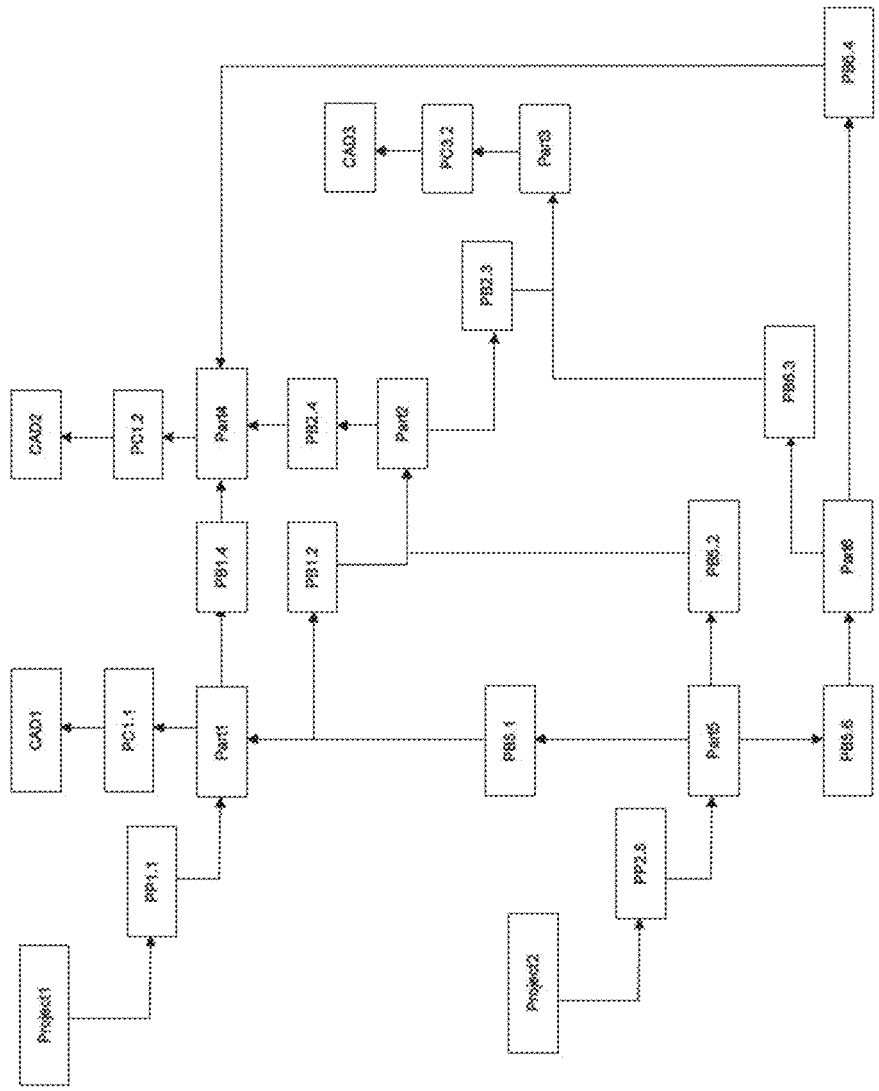
FIG. 16 illustrates domain examples including subdomains and items in the subdomains in a tree form according to embodiments of this disclosure.
Figure 17:
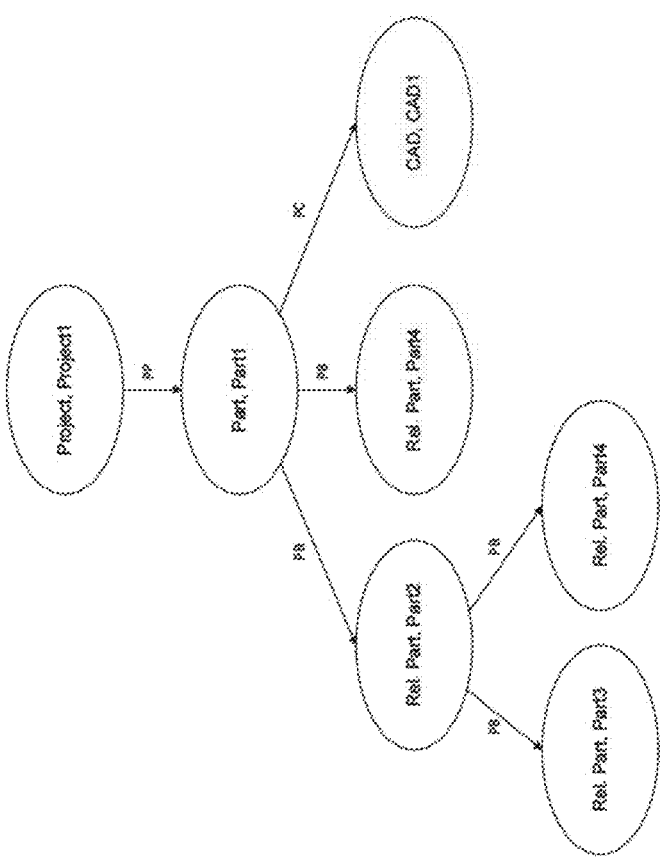
FIG. 17 illustrates example query execution results tree for a context item according to embodiments of this disclosure.
Figure 18:
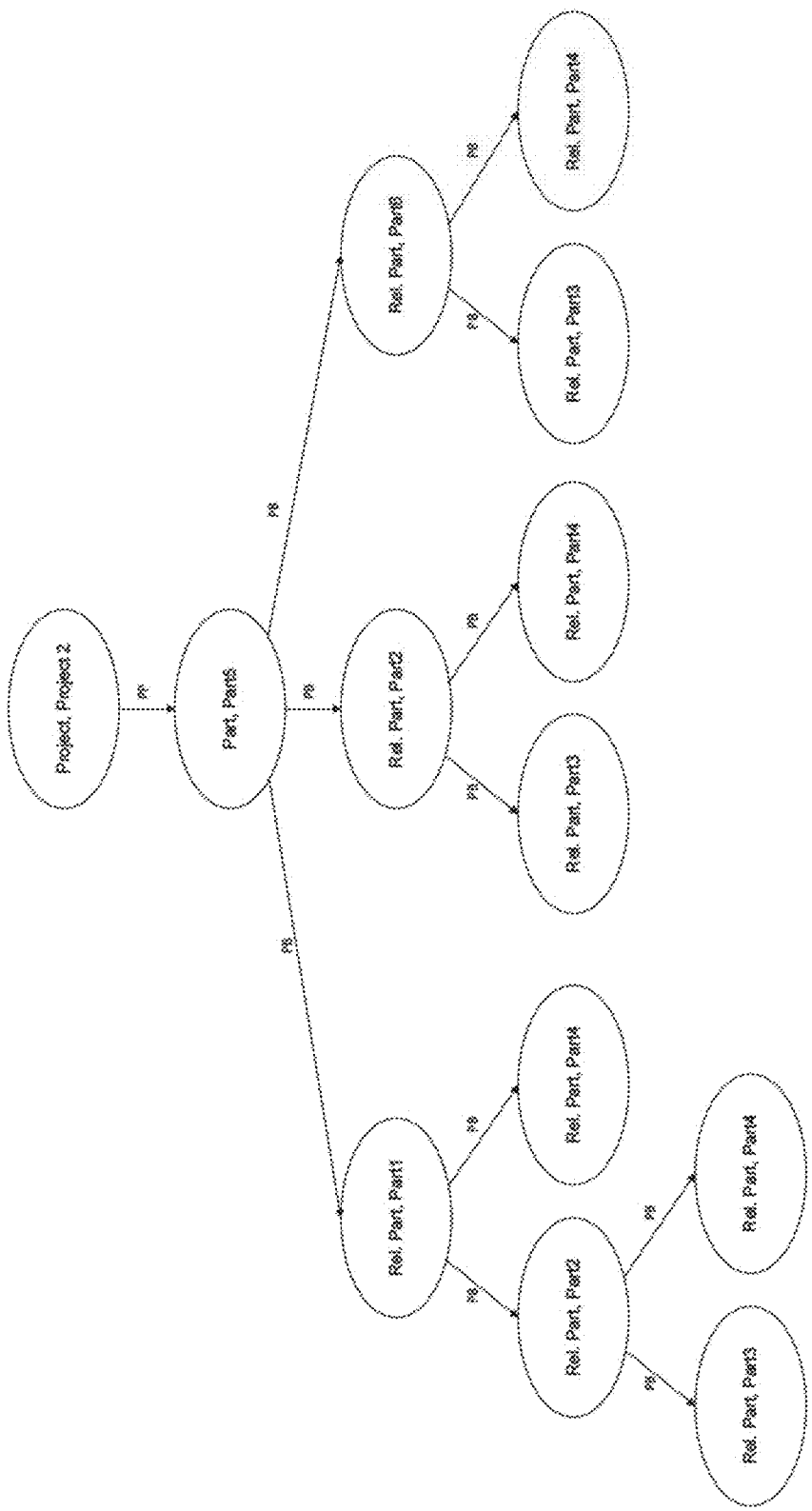
FIG. 18 illustrates another example query execution results tree for a context item according to embodiments of this disclosure.

FIG. 16 illustrates domain examples including subdomains and items in the subdomains in a tree form according to embodiments of this disclosure. FIGS. 17 and 18 illustrate an example query execution results tree for a context item according to embodiments of this disclosure. For purposes of clarity, FIGS. 16-18 are discussed together below.

As depicted in FIG. 17, the context item "Project1" was provided in the query. The results depict that a project part "PP" connects the "Project1" domain to a part "Part1". Further, the results depict that part "Part1" is associated with a related part "Part2" via a part BOM, part "Part1" is associated with a related part "Part4" via another part BOM, and part "Part1" is associated with a CAD "CAD1" via a part CAD. Additional items that are returned in the results include a related part "Part3" that is associated with part "Part2" via a part BOM and a related part "Part4" that is associated with related part "Part2" via another part BOM.

As depicted in FIG. 18, the context item "Project2" was provided in the query. The results depict that a project part "PP" connects the "Project1" domain to a part "Part5". Further, the results depict that part "Part5" is associated with a related part "Part1" via a part BOM. Additional items that are returned in the results include a related part "Part2" that is associated with related part "Part1" via a part BOM and a related part "Part4" that is associated with related part "Part1" via another part BOM. Also, relative part "Part2" is associated with related part "Part3" via a part BOM and is associated with related part "Part4" via another part BOM.

Part "Part5" is also associated with a related part "Part2" via another part BOM. Related part "Part2" is associated with a related part "Part3" via a part BOM and is associated with related part "Part4" via another part BOM.

Part "Part5" is also associated with a related part "Part6" via another part BOM. Related part "Part6" is associated with related part "Part3" via a part BOM and is associated with related part "Part4" via another part BOM.

Figure 19:
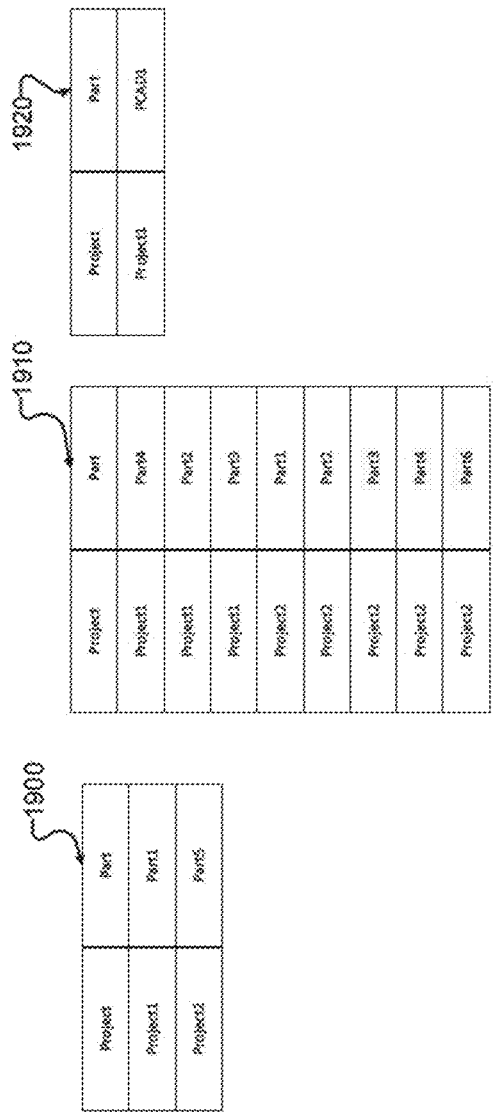
FIG. 19 illustrates example derived relationships according to embodiments of this disclosure.

FIG. 19 illustrates example derived relationships according to embodiments of this disclosure. In some embodiments, derived relationships may refer to subdomains of a domain. In some examples, subdomains of a project domain may include a part, related part, and CAD. Continuing the examples shown in FIGS. 16-18, FIG. 19 illustrates the derived relationships for the domains "Project1" and "Project2". For example, in table 1900, parts are depicted for each of the projects: part "Part1" is associated with project "Project1", and part "Part5" is associated with project "Project2". In table 1910, related parts are depicted for each of the projects. For example, project "Project1" is associated with part "Part4", "Part2", and "Part3". Project "Project2" is associated with "Part1", "Part2", "Part3", "Part4", and "Part6". In table 1920, a CAD "PCAD1" is depicted as being associated with project "Project1". As may be appreciated, items, such as "Part2", may be shared across numerous domains in different subdomains. That is, an item may be included in different subdomains with the same domain or may be included in different domains altogether. Further, each domain may include different roles with differing access rights. Accordingly, embodiments disclosed herein enable determining the access rights for the domain based system using one or more subdomain policies and the roles of the user.

Figure 20:
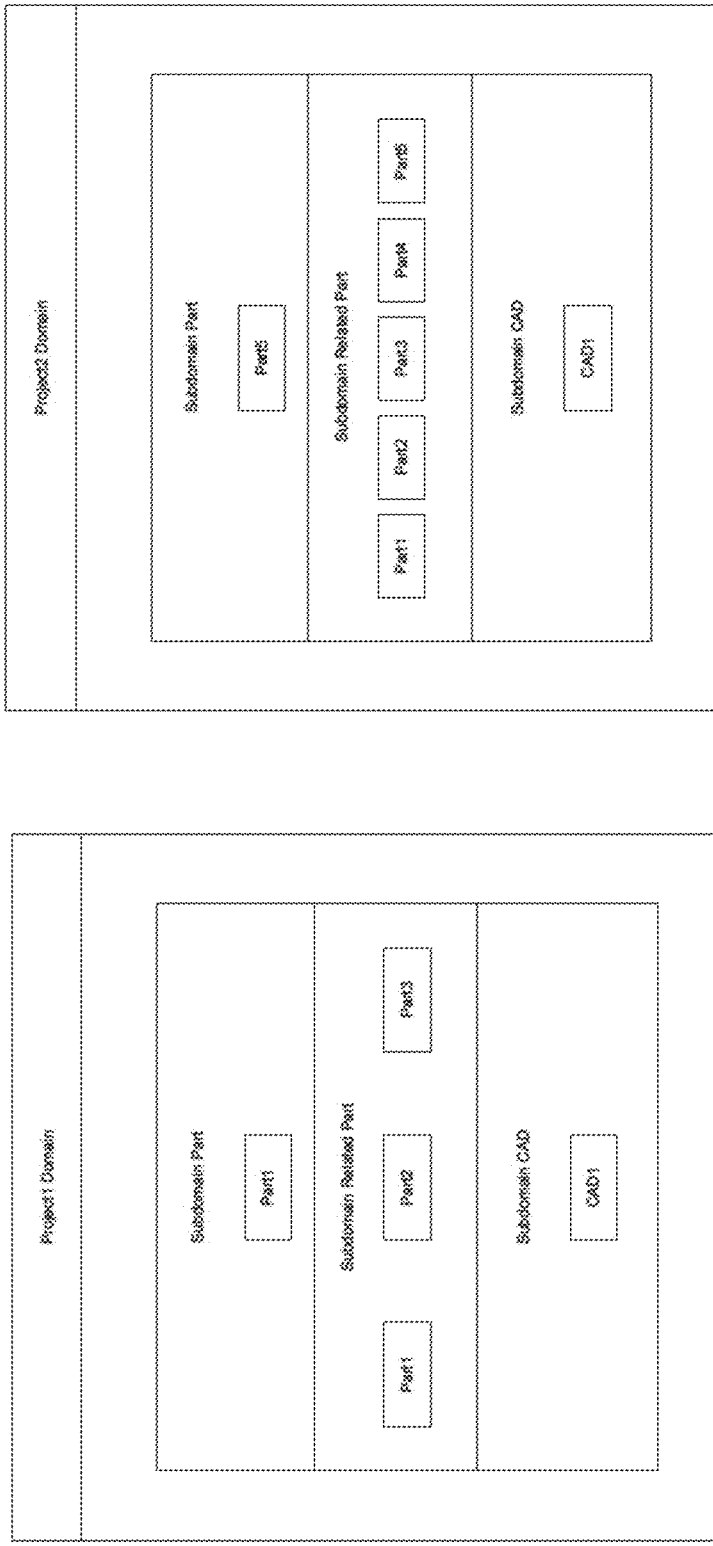
FIG. 20 illustrates domain examples including subdomains and items in subdomains in graphic form according to some embodiments of this disclosure.

FIG. 20 illustrates domain examples including subdomains and items in subdomains in graphic form according to some embodiments of this disclosure. For the "Project1" domain, there are three subdomains: Subdomain Part, Subdomain Related Art, and Subdomain CAD. One item part "Part1" is included in the Subdomain Part, three part items "Part1", "Part2", and "Part3" are included in the Subdomain Related Part, and one CAD item "CAD1" is included in the Subdomain CAD. For the "Project2" domain, there are three subdomains: Subdomain Part, Subdomain Related Art, and Subdomain CAD. One item part "Part5" is included in the Subdomain Part, five part items "Part1", "Part2", "Part3", "Part4", and "Part5" are included in the Subdomain Related Part, and one CAD item "CAD1" is included in the Subdomain CAD.

Figure 21:
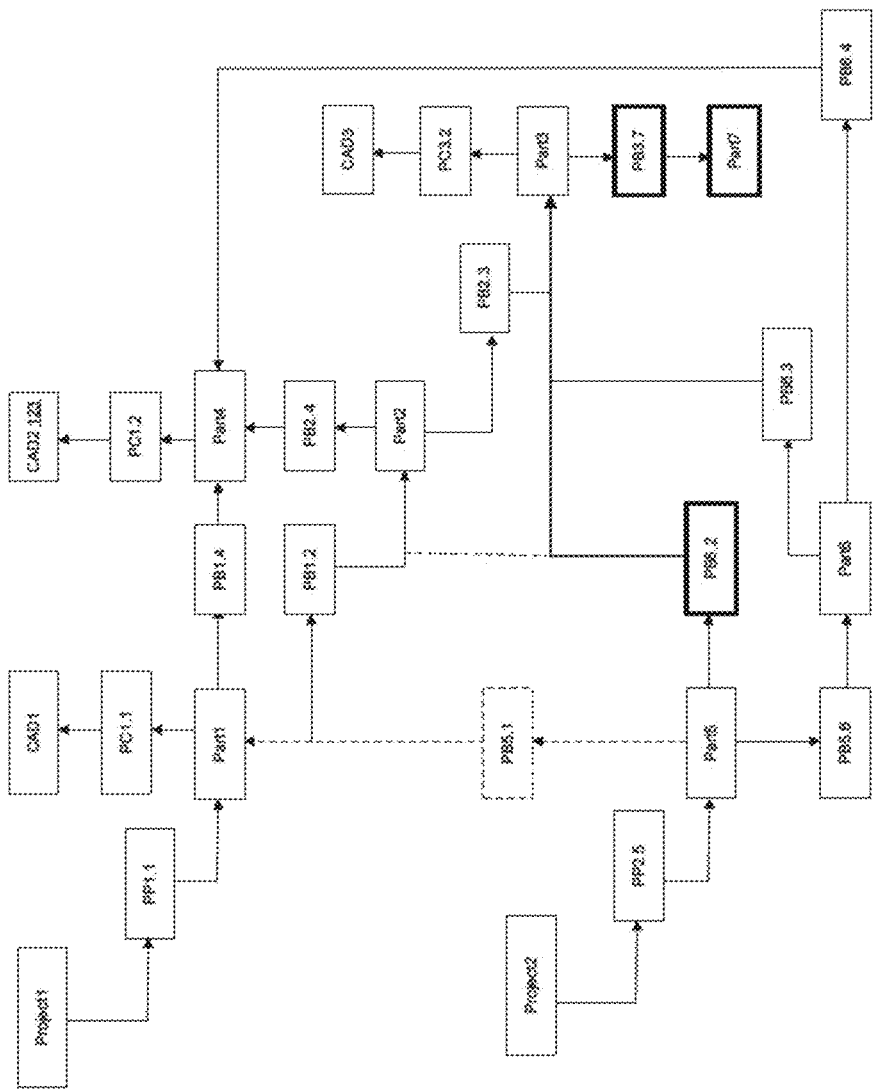
FIG. 21 illustrates changes made to items that result in updated mappings of the domains, subdomains, and items in a tree according to some embodiments of this disclosure.

FIG. 21 illustrates changes made to items that result in updated mappings of the domains, subdomains, and items in a tree according to some embodiments of this disclosure. As depicted, relationships for part "Part5" in "Project2" domain was changed by deleting part BOM "PB5.1". This severs the connection between "Project2" domain and the related part of "Part1". Also, the connection between part BOM "PB5.2" and part "Part2" was changed, thereby severing the connection between "Project2" domain and the related part of "Part2". Further, part BOM "PB3.7" and part "Part7" were added items.

Figure 22:
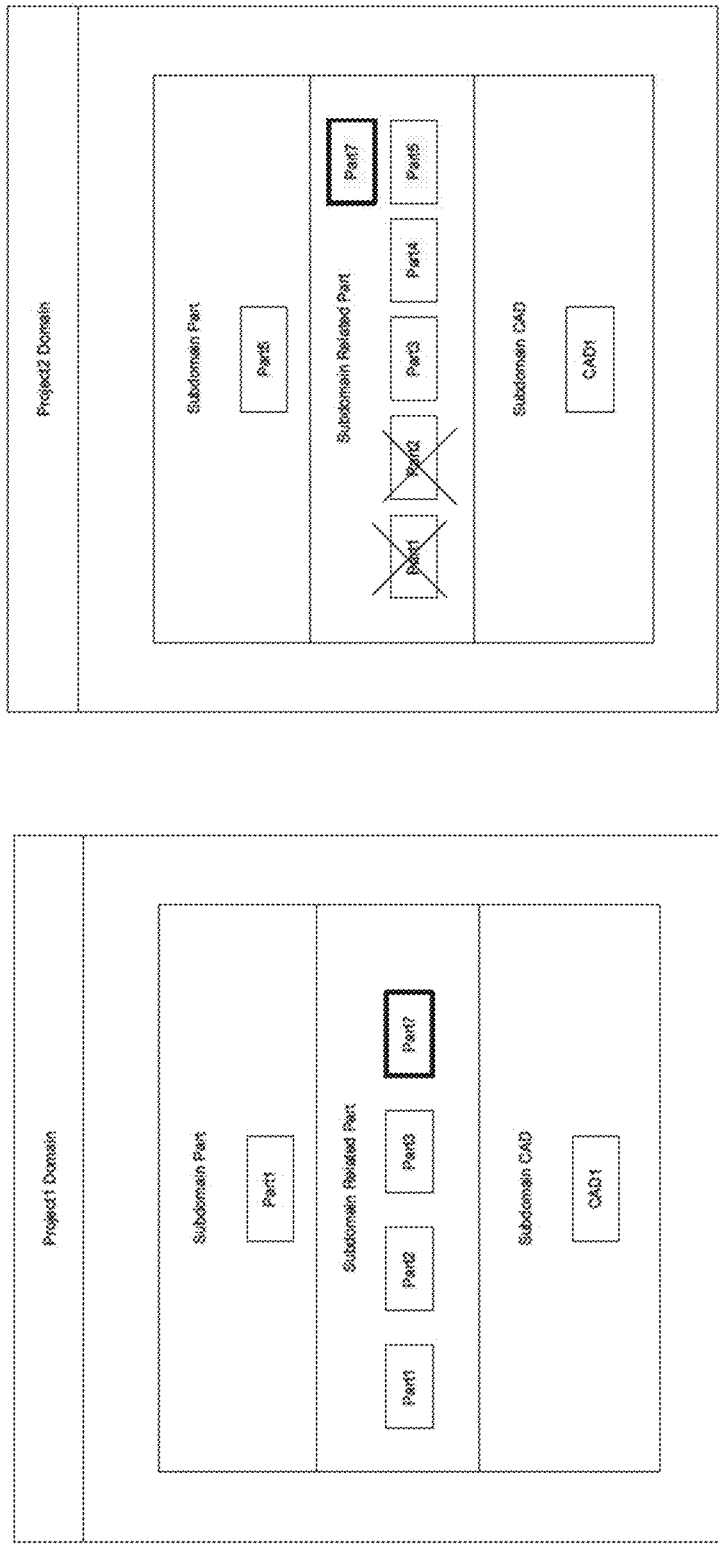
FIG. 22 illustrates the changes made to the items in FIG. 21 represented in graphic form according to some embodiments of this disclosure.

FIG. 22 illustrates the changes made to the items in FIG. 21 represented in graphic form according to some embodiments of this disclosure. The derived relationship may be updated dynamically in the mappings based on the changes to the item data. As depicted, for the "Project1" domain, part "Part7" is added to the Subdomain Related Part. For the "Project2" domain, part "Part1" and part "Part2" are removed (represented by the "X's") from the Subdomain Related Part based on the changes to the data items discussed above. Further, part "Part7" is added to the Subdomain Related Part. Accordingly, membership for an item in a domain may change dynamically as the primary relationships are modified by the user and/or processes. The mapping of the items membership in the domains may be maintained in memory after initially executing a query defined by query definition. For example, the mapping may be maintained as a linked list and the nodes of the link list may represent the items of data. The nodes in the linked list may be added, removed, or modified as the items of data are changed by the user and/or processes.

Figure 23:
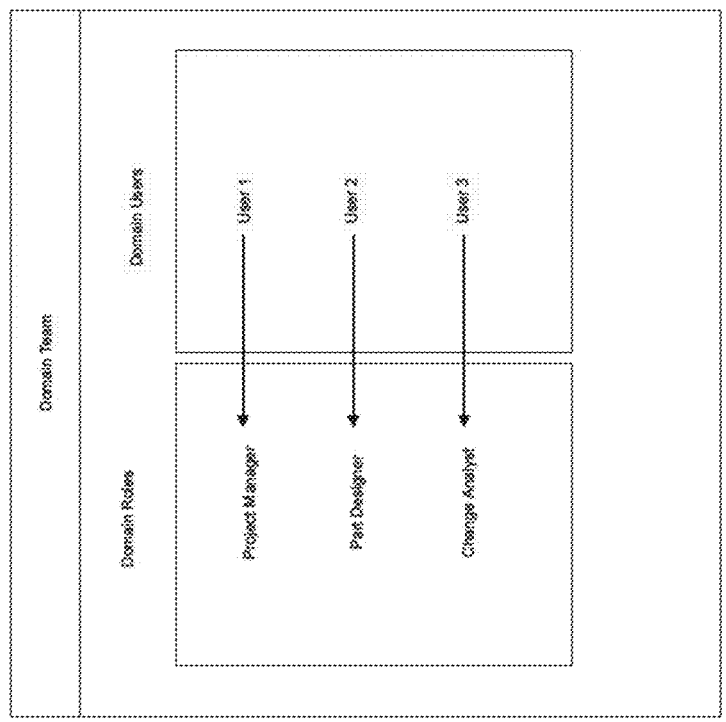
FIG. 23 illustrates example domain access control domain team according to some embodiments of this disclosure.

FIG. 23 illustrates example domain access control domain team according to some embodiments of this disclosure. A domain may include subdomains including a set of items of data or content. In some embodiments, items are the constituent members of a database or storage volume (for example, an item defined by the configuration document 300 shown in FIG. 3). In other embodiments, items within the set of items can be items within a self-defining data structure, such as described throughout this disclosure. The set of items within a domain may have a logical relationship to a central object or root item. In some embodiments, the root item may be an item within the set of items of the domain.

Each domain has an associated domain team. The domain team may list the users that are designated and/or authorized to work in the domain and assign to them a certain domain role. The domain role determines what kind of access rights is allowed for items in each domain subdomain for users in the role. As depicted, the domain roles may include a project manager, part designer, and change analyst. The domain users "User 1" is assigned the project manager role, "User 2" is assigned the part designer role, and "User 3" is assigned the change analyst role. The users may be authenticated individuals (e.g., enterprise employees who have logged into a system, such as ARAS INNOVATOR, for accessing items within a set of items). In some embodiments, the users may be applications or processes executing on a trusted computing platform, which access items within set of items programmatically. For example, an application or process for preserving documents subject to a litigation hold may programmatically access items by reading and downloading them to make them available for production in response to a court order.

The different roles may be associated with different access rights, such as get, update, delete, etc. In some embodiments, when a user submits a request for an item, every domain to which the item belongs is determined and the user roles in each of those domains is determined to make a decision of whether to provide the requested access to the user. For example, the user may have a project manager role for one domain, which has certain access rights to items in that domain based on a subdomain access control policy, and the user may have a part designer role for another domain, which has different access rights to items in that domain based on another subdomain access control policy.

Figure 24:
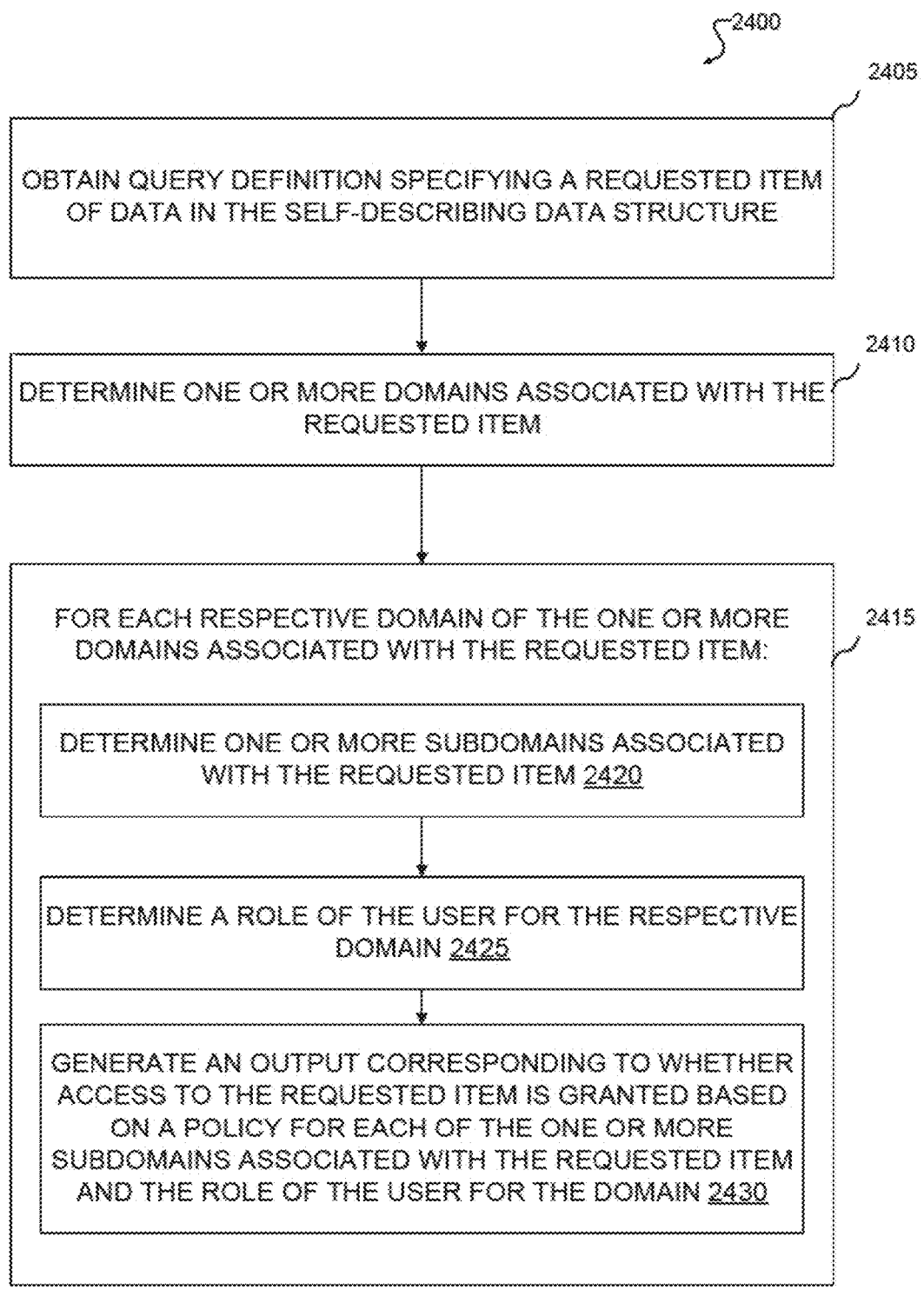
FIG. 24 illustrates operations of a method for implementing domain based access control on queries in a self-describing data system according to some embodiments of this disclosure.

FIG. 24 illustrates operations of a method 2400 for implementing domain based access control on queries in a self-describing data system according to some embodiments of this disclosure. The operations of method 2400 may be implemented as computer instructions and executable by one or more processors. In some embodiments, one or more of the operations may be executed by the query engine 415 of the backend 410 and/or the database server 405.

According to embodiments, method 2400 includes operation 2405, wherein an apparatus within a network (for example, front end 420, back end 410, query engine 415, or a process operating on database server 405 in FIG. 4) obtains a query definition, the query definition created by a user known to the apparatus (for example, by a network address associated with the query definition, session data, or credentials authenticated during a login procedure to the network). In this non-limiting example, the user submitting the query apparatus has a set of defined access permissions which are known, or available to the apparatus. As described further below, the set of permissions may be configured per domain for the user.

At operation 2410, the apparatus determines one or more domains associated with the requested item. The one or more domains including a set of items of data in the self-describing data structure on an execution path of a query executed according to the query definition. For example, in the example depicted in the updated membership graphic form of the domains, subdomains, and items in FIG. 22, item part "Part3" is included in both domains "Project1" and "Project2".

Returning to FIG. 24, at operation 2415, for each respective domain of the one or more domains associated with the requested item, the apparatus determines (operation 2420) one or more subdomains associated with the requested item, determines (operation 2425) a role of the user for the respective domain, and generates (operation 2430) an output corresponding to whether access to the requested item is granted based on a policy for each of the one or more subdomains associated with the requested item and the role of the user for the domain. For example, in FIG. 22, item part "Part3" is included in Subdomain Part in both "Project1" and "Project2" domains. The apparatus may search the domain team depicted in FIG. 23, which contains the roles for each user in each domain to determine the role of the user for the respective domains. The policy for each subdomains is explained further with reference to FIGS. 25 and 26, but in general the policy indicates that the user role has certain access rights to an item in the subdomain based on a state of a root item and/or a state of the subdomain item when request to the item is made.

In some embodiments, the apparatus may combine the output generated for each of the one or more domains to determine whether to grant access to the user to the requested item in the one or more subdomains located in the respective domain. Access may be granted to the requested item if the output generated for any of the one or more domains indicates that access to the requested item is granted for the role of the user in any of the one or more subdomains after combining the outputs.

For example, in some embodiments, the apparatus may determine that the user does not have access to the requested item in one domain based on the policy for a subdomain of that domain and the role ("part designer") of the user in that domain. However, the apparatus may determine that the user has access to the requested item in another domain based on the policy for another subdomain of the other domain and the role ("project manager") of the user in the other domain. The apparatus may generate the output to indicate that access to the user to the requested item is granted in the first domain based on determining that the user has access to the requested item in the other domain.

Upon executing the query in the query definition, the apparatus may maintain, in a database on a server, for example, a mapping of the one or more domains each including the one or more subdomains and the set of items in the one or more subdomains. Over time a user and/or a process may modify, add, and/or delete data for items in subdomains, which can cause membership of items in domains to alter, as shown in the examples in FIGS. 21 and 22. In some embodiments, the apparatus may dynamically update the mapping of the membership of the items in the various domains using a logical language in the database without re-executing the query in the query definition.

In some embodiments, generating the output corresponding to whether access to the requested item is granted based on the policy for each of the one or more subdomains associated with the requested item and the role of the user for the domain further includes determining a state of the requested item, determining a state of a root item of the respective domain, and identifying the output in a rule data structure based on the state of the requested item, the state of the root item, and/or the role of the user. The rule data structure may be a lookup table. The output may include different access rights that are granted for different roles of the user in a domain based on the state of the requested item, the state of the root item, or some combination thereof. The access rights may include get, update, delete, add, and so forth.

Figure 25:
FIG. 25 illustrates a subdomain access control policy decision table according to some embodiments of this disclosure.

FIG. 25 illustrates a subdomain access control policy decision table 2500 according to some embodiments of this disclosure. The subdomain access control policy decision table 2500 may be used to determine the access rights for a requested item in a subdomain of a domain to which the requested item belongs. The policy of a subdomain may depend on the state of the requested item, the state of the domain root item, and/or the role(s) that the user who is making the access request is assigned for a domain. As depicted, the subdomain access control policy defines a set of rules that, given the item and the root item states, may be used to determine the permissions that should be used for determining the access rights of the requested item. For example, a first rule indicates that when the input for "Root Item state" is "RI_Condition1" and the input for "Subdomain Item state" is "SI_Condition1", the output "Subdomain Permission" should be "Permission1". The apparatus may determine if the access rights should be granted by "applying" the user domain role(s) to the permissions. The Project Part permissions do not depend on the state of the root item (Project) in the depicted example.

Figure 26:
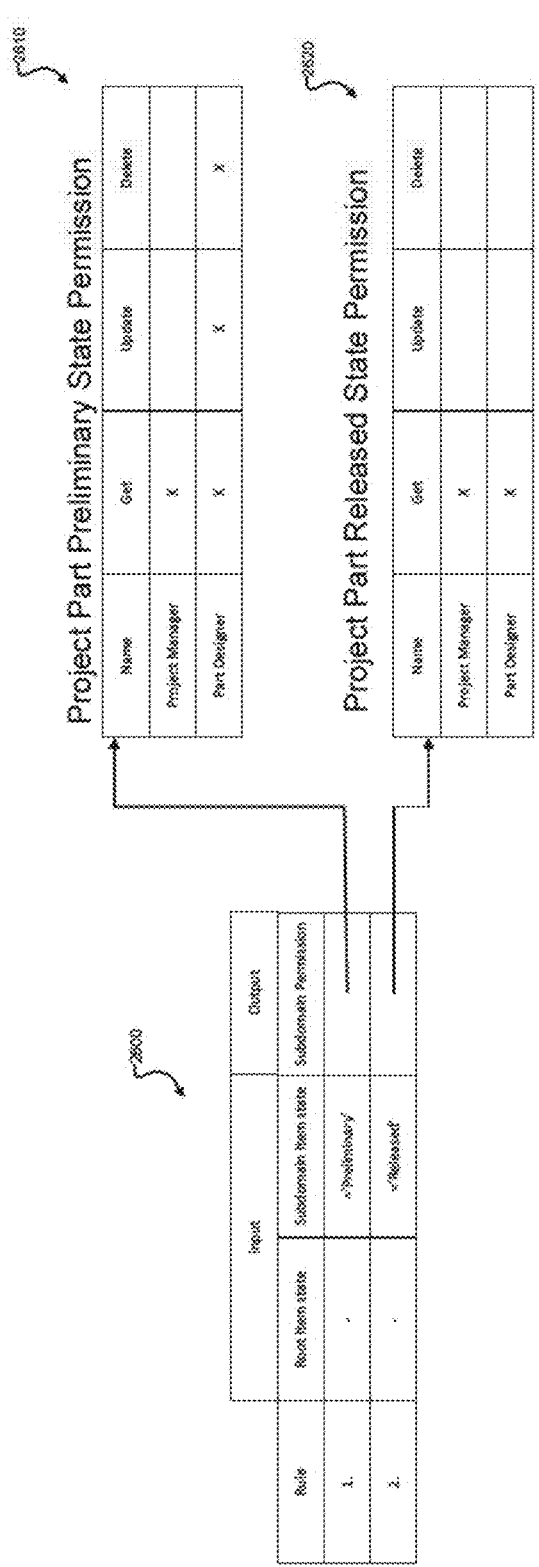
FIG. 26 illustrates the subdomain access control policy decision table based on differing roles for a user according to some embodiments of this disclosure.

FIG. 26 illustrates the subdomain access control policy decision table 2600 based on differing roles for a user according to some embodiments of this disclosure. The depicted example subdomain access control policy decision table 2600 is for the subdomain Project Part. There are two states depicted for the "Subdomain Item state," "Preliminary" and "Released".

When the "Subdomain Item state" is in a "Preliminary" state, the apparatus may refer to "Project Part Preliminary State Permission" table 2610. As depicted, different roles in the domain are provided different access rights when the state of the subdomain item is "Preliminary". For example, when a project part is in "Preliminary" state, a part designer role can be provided access rights to get, update, and delete the item. When the project part is in the "Released" state, a project manager may be allowed access rights to just get the item.

When the "Subdomain Item state" is in a "Released" state, the apparatus may refer to "Project Part Released State Permission" table 2620. As depicted, different roles in the domain are provided different access rights when the state of the subdomain item is "Released". For example, when a project part is in "Released" state, a part designer role can be provided access rights to just get the item. When the project part is in the "Released" state, a project manager may also be allowed access rights to just get the item. A project manager may not be allowed to update or delete a project part item in any state.

Figure 27A:
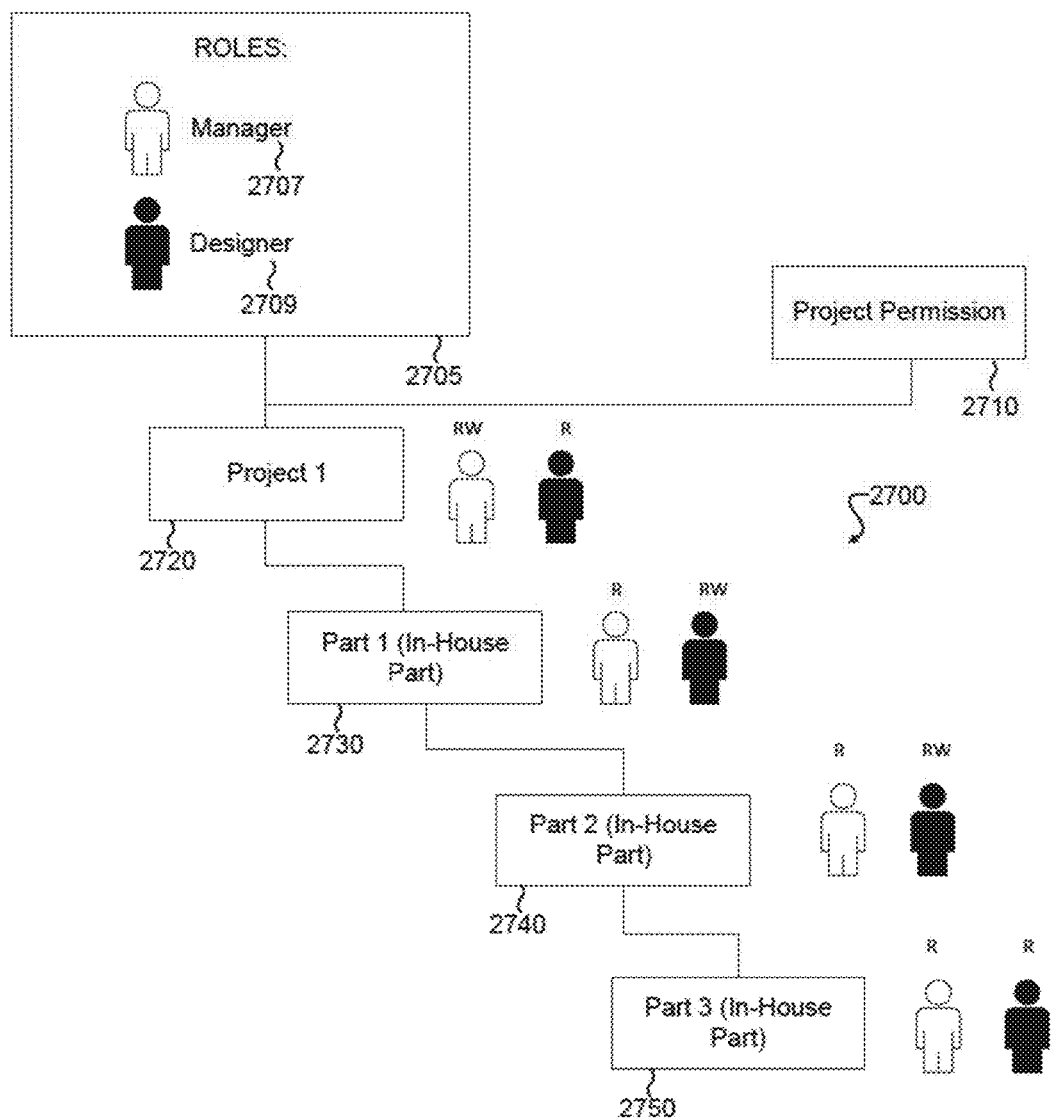
FIG. 27A illustrates an example of an implementation of domain-based access controls utilizing rooted domain access control domains according to some embodiments of this disclosure.
Figure 27A:
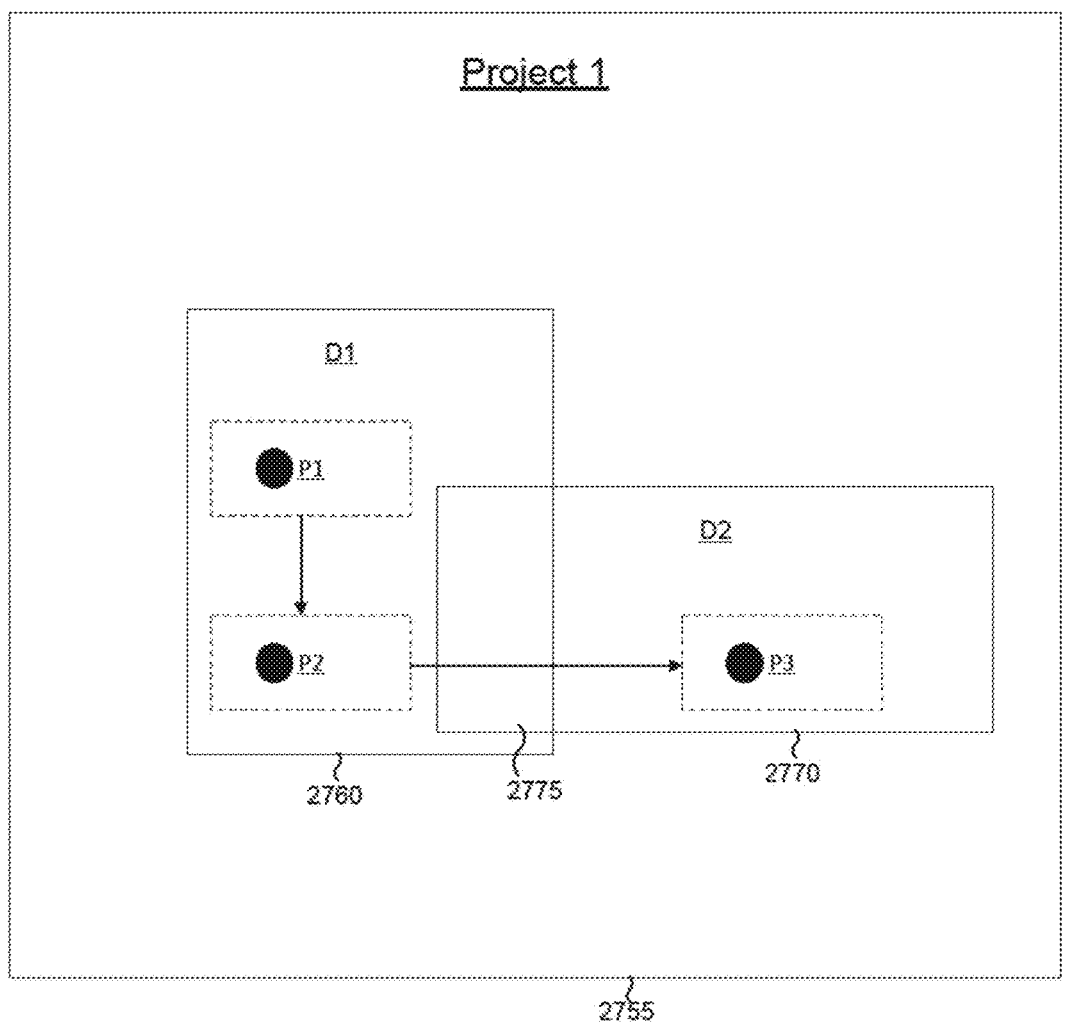
Figure 27B:
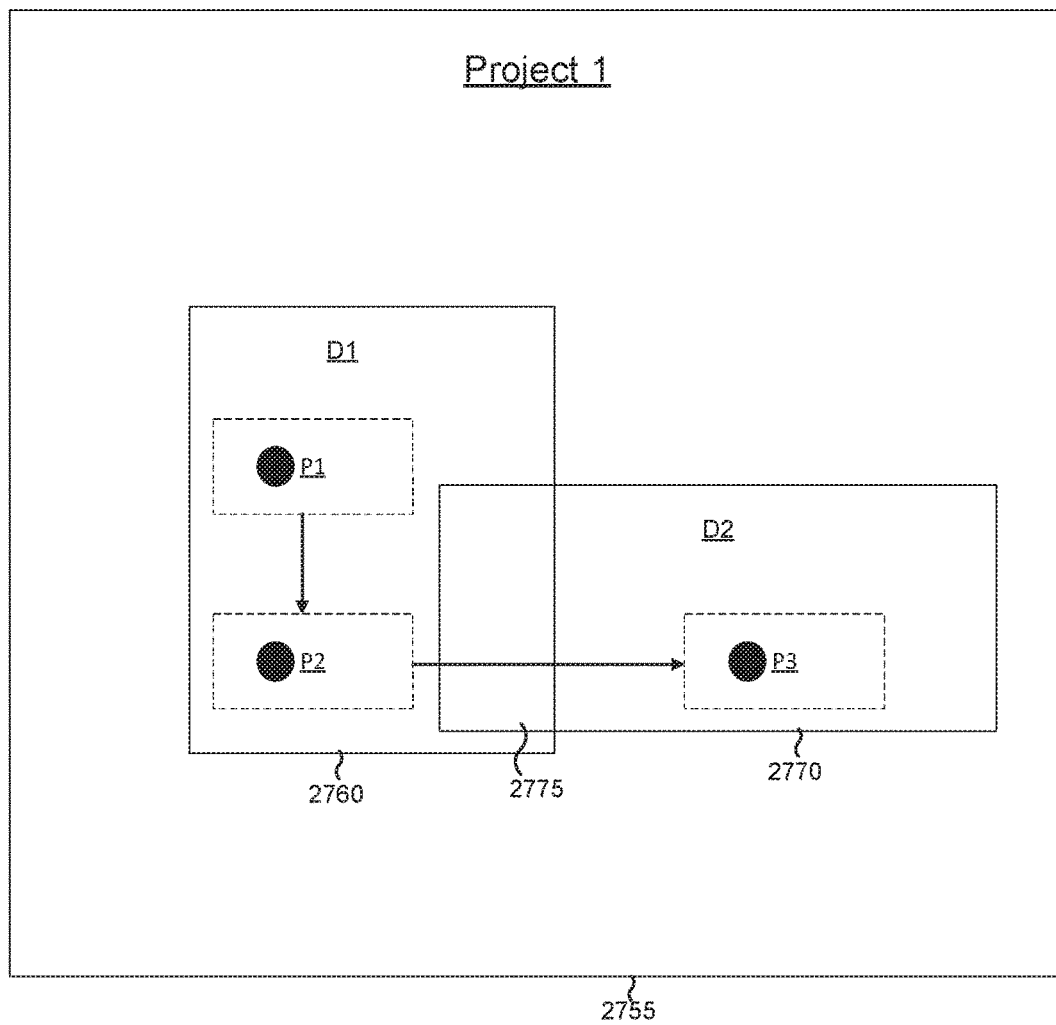
FIG. 27B illustrates a mapping of relevant domains and subdomains associated with the non-limiting example shown in FIG. 27A.

FIG. 27A illustrates an example of an implementation 2700 of domain-based access controls utilizing rooted domain access control domains according to some embodiments of this disclosure. FIG. 27B illustrates a mapping of relevant domains and subdomains associated with the non-limiting example shown in FIG. 27A.

Referring to the non-limiting example of FIG. 27A, implementation 2700 of domain-based access controls includes a set of roles 2705, a set of project permissions 2710, and four items 2720, 2730, 2740, and 2750. As discussed herein, items 2720-2750 are members of a domain defined by one or more relationships to a root item, and subdomains of the domain defined by one or more relationships to the item (also referred to herein as a "rooted domain access control ("DAC") domain"). The example of FIG. 27 shows set of roles 2705 as including two roles with access permissions to the domain define as "manager" 2707 and "designer" 2709. As noted elsewhere, other roles within set of roles 2705 are possible, and may include, without limitation, roles associated with non-human actors, such as system processes or business logic. Multiple entities (e.g., authenticated users of an item management system) may be associated with a given role.

In some embodiments, implementation 2700 further includes one or more sets of project permissions 2710. In this example, the one or more sets of project permissions 2710 include a DAC domain definition. In some embodiments, where the domain access control is performed on items belonging to a self-describing data structure, the DAC domain definition is based on a query definition specifying the relationships of items (also referred to herein as "access control items") within the domain to a root item.

Further, set of project permissions 2710 may further include an index of subdomains of a root domain defined by a DAC domain definition. Additionally, as described above, set of project permissions 2710 may include a DAC policy, which provides a mapping of access rights to entities (e.g., users, systems, processes) based on their assigned domain roles. Further, one or more sets of policy combining rules may be used to specify how access rights given by different domains are combined for a final output of access rights to requested items. By way of simple example, a policy combining rule may be "grant requested access if the access is granted at least by one policy covering the request." Other examples of policy combining rules are possible, such as if a request falls under a policy associated with a first domain, ignore access granted by policies associated with other domains to which the requested item belongs.

Set of permissions 2710 may also include a mapping of entities having access permissions (also referred to herein as "DAC Users") to access one or more access control items, as well as the role(s) of each DAC User.

In the depicted example, "Project 1" 2720 is a root object, or root item, to which items in a DAC domain (shown as domain 2755 in FIG. 27B) are logically related through a DAC domain definition. According to some embodiments, the DAC domain definition mirrors the syntax and structure of a query definition, and supports recursive searches through a self-defining data structure to dynamically identify items belonging to the DAC domain. As shown in FIGS. 27A and 27B, the "Manager" role 2707 has read-write access to root items of domain 2755 associated with the "Project 1" root item. Similarly, the "Designer" role 2709 has read-only access to items in domain 2755.

As noted above, a DAC domain definition is based on a query definition for a recursive query of a self-defining data structure. In this example, a first recursion of a query according to the DAC domain definition establishes "Part 1" 2730 as belonging to the domain 2755 of items logically associated with the root item "Project 1". Additionally, as shown in FIG. 27B, Part 1 (marked "P1") also belongs to a subdomain 2760, which is associated with in-house parts, and which has its own set of role-based access policies. It should be understood that an item that belongs to a domain can belong to more than one subdomain of that domain. In this case, one or more policy combining rules provided as part of project permissions 2710 prioritizes the role-based access permissions associated with subdomain 2760 over the role-based access permissions associated with domain 2755. By implementing one or more policy combining rules to prioritize the role-based access permissions of the subdomain 2760 associated with "Project Parts," entities associated with "manager" role 2707 have read-only access to items in subdomain 2760, while entities associated with "designer" role 2709 have read-write access to items in subdomain 2760. Other embodiments utilizing different policy combining rules are possible, such as cumulative rules, where each role gets all of the access permissions of each domain to which the requested item belongs. According to such embodiments, the "manager" role 2707 would have read-write access to part 1. While "manager" role 2707 affords read-only access to part 1 through subdomain 2760, part 1 is also an item within root domain 2755, which provides "manager" role 2707 with read-write access. Similarly, "designer" role 2709 would, in this alternative embodiment, have read-write access to part 1 based on the DAC policy for subdomain 2760.

In the non-limiting example of FIG. 27A, a second recursion of a query according to the DAC domain definition establishes "Part 2" 2740 as also belonging to subdomain 2760 associated with "In-house Parts," meaning that "Part 2" 2740 is logically related to "Part 1" 2730. The relationship between "Part 1" 2730 and "Part 2" 2740 may be one of the relationship types described with reference to FIG. 6 of this disclosure. For example, in some embodiments, "In House Part" may be a defined type, and "Part 1" 2730 and "Part 2" 2740 are both items of the "In House Part" item type. As shown in FIG. 27B, "Part 2" 2740 belongs to the same logical domain and subdomain as "Part 1." Accordingly, "Part 2" implicates the same domain and policy combining rules as "Part 1" 2730, and, as such, the access permissions for roles 2707 and 2709 are the same, with "manager" role 2707 having read-only access permissions, and "designer" role 2709 having read-write permissions.

In the non-limiting examples of FIGS. 27A and 27B, a third recursion of a query according to the DAC domain definition establishes that "Part 3" 2750 is logically related to "Part 2" 2740. As shown in FIG. 27B, "Part 3" belongs to a second subdomain 2770 corresponding to "standard parts." According to some embodiments, second subdomain 2770 may be defined according to a specific relationship (for example, a query reference item type) to items in another domain or subdomain. For example, items in subdomain 2760 may be defined to have a parent relationship to items in subdomain 2770. Additionally, as shown in FIG. 27B, some items (shown as region 2775) in subdomain 2770 also belong to subdomain 2760. In this non-limiting example, the access control platform applies policy combining rules to determine the relative priority of the role-based access priorities associated with subdomain 2760 and subdomain 2770. Here, the policy combining rules indicate that the role-based access control policies associated with subdomain 2770 take precedence. Accordingly, "manager" role 2707 and "designer" role 2709 both have read-only access.

FIG. 28 illustrates an implementation 2800 of domain access controls using derived relationships in various embodiments of this disclosure. As shown through the illustrative examples of FIGS. 27A and 27B, domain-based access controls can provide granular and dynamic access controls for items within a self-describing data structure.

The functionality of domain-based access controls can be extended by implementing derived relationships between items.

Referring now to FIG. 28, four items 2820, 2830, 2840, and 2850 of a self-describing data set are shown in implementation 2800. For efficiency of illustration, in this particular example, each of items 2820 through 2850 correspond to items 2720 through 2750 described in connection with FIGS. 27A and 27B. Additionally, each of items 2820 through 2850 are similarly related through a DAC domain definition and belong to the domains and subdomains shown in FIG. 27B. As a contrast to derived relationships, the relationships between items 2820 through 2850 set forth in the DAC domain definition may be referred to herein as basic relationships.

According to some embodiments, the determination of access rights for items belonging to multiple DAC domains or subdomains includes an identification of the domain and subdomain(s) to which a requested item belongs, and the application of one or more policy combining rules to determine the precedence of the domain-based access control policies of the domains and subdomains claiming the requested item.

Instead of, or in addition to, utilizing policy combining rules to navigate the determination of the appropriate access policy for items belonging to multiple subdomains, certain embodiments according to this disclosure implement derived relationships.

As used in this disclosure, the term derived relationship refers to a relationship calculated or "derive" from the application of an operation to sets of items obtained through one or more basic relationships. According to some embodiments, the applied operation may be a unary operation, such as inversion, restriction, or transitive closure. According to some embodiments, the operation may be one which takes multiple operands, such as a composition, union, or intersection.

In FIG. 28, the role-based access permissions to items 2830, 2840, and 2850 are determined according to subdomains derived by performing a composition between the set of items related through the DAC definition of FIGS. 27A and 27B, and items related through the conditionals "secret part=true" and "secret part=false." That is, in the example of FIG. 28, the two relevant subdomains for implementing domain-based access controls are determined by performing a composition of items related through the rooted DAC definition of FIGS. 27A and 27B, and whether the items are related as secret parts (e.g., if "secret part=true").

As shown in FIG. 28, items 2830 and 2840 both belong to a subdomain defined through the derived relationship calculated from the composition of the relationship defined by the DAC definition of FIG. 27, and the relationship "secret part=true". Accordingly, both items 2830 and 2840 have the same ole-based access permissions, where the "manager" role has read-only access permissions, and the "designer" role has read-write access permissions.

Similarly, in FIG. 28, item 2850 belongs to a different subdomain than items 2830 and 2840. Item 2850 belongs to the subdomain defined by the DAC definition of FIG. 27, and the relationship "secret part=false." As such, the role-based access permissions for item 2850 are different than for items 2830 and 2840, which belong to a different subdomain. In this particular example, both the "manager" and "designer" roles have read-only access permissions.

In implementations where calculation of a basic relationship is computationally expensive, the use of derived relationships to dynamically determine access control domains can lighten the computation load associated with determining an entity has access permissions to a requested item. This is because the domain defined by the DAC definition need not be recalculated each time access is requested. Instead, identifying the relevant domain for access control of the item comprises performing a calculation to determine the subdomain defined by a derived relationship, which depending on the complexity of the calculation, can be significantly simpler than executing a query to determine a domain associated with a DAC definition. Thus, the use of derived relationships can enhance the ability of an access control platform to dynamically update the relevant subdomain for implementing access controls over an item. The membership of items in the domains may be dynamically modified and maintained as a mapping in a database.

None of the description in this application should be read as implying that any particular element, step, or function is an essential element that must be included in the claim scope. The scope of patented subject matter is defined only by the claims. Moreover, none of the claims is intended to invoke 35 U.S.C. § 112(f) unless the exact words "means for" are followed by a participle.

What is claimed is:

1. A method for implementing access controls for items of data belonging to a self-describing data structure, the method comprising:
    obtaining a query definition specifying a requested item of data in the self-describing data structure;
    determining one or more domains associated with the requested item, the one or more domains comprising a set of items within the self-describing data structure on an execution path of a query executed according to the query definition;
    for each respective domain of the one or more domains associated with the requested item:
        determining one or more subdomains associated with the requested item, wherein the one or more subdomains are located in the respective domain;
        determining a role of the user for the respective domain, wherein the role is associated with a set of access permissions to items of data within the domain; and
        generating, by a processing device, an output corresponding to whether access to the requested item is granted based on a policy for each of the one or more subdomains associated with the requested item and the role of the user for the domain, the generating comprising:
            determining a first state of the requested item, the first state associated with a subdomain item state;
            determining a second state of a root item of the respective domain, the second state associated with a root item state; and
            identifying the output in a rule data structure based on the first state of the requested item, the second state of the root item, and the role of the user.

2. The method of claim 1, further comprising combining the output generated for each of the one or more domains to determine whether to grant access to the user to the requested item in the one or more subdomains located in the respective domain, wherein access is granted to the requested item if the output generated for any of the one or more domains indicates that access to the requested item is granted for the role of the user in any of the one or more subdomains.

3. The method of claim 1, wherein the requested item is included in a first domain and a second domain, the query definition specifies accessing the requested item in the first domain, and the method further comprises:
    determining that the user has access to the requested item in the second domain based on the policy for a second subdomain of the second domain and the role of the user; and
    generating the output to indicate that access to the user to the requested item is granted in the first domain based on determining that the user has access to the requested item in the second domain.

4. The method of claim 1, further comprising maintaining a mapping of the one or more domains each including the one or more subdomains and the set of items in the one or more subdomains.

5. The method of claim 4, further comprising updating the mapping when data included in the set of items is modified.

6. The method of claim 1, wherein the rule data structure is a lookup table.

7. The method of claim 1, wherein the output comprises different access rights that are granted for different roles of the user based on the first state of the requested item, the second state of the root item, or some combination thereof.

8. The method of claim 7, wherein the access rights comprise get, update, and delete.

9. The method of claim 1, wherein the access controls are implemented by a query engine in a system for performing recursive searches in the self-describing data structure.

10. A tangible, non-transitory computer-readable medium storing instructions that, when executed, cause one or more processing devices to:
    obtain a query definition specifying a requested item of data in a self-describing data structure;
    determine one or more domains associated with the requested item, the one or more domains comprising a set of items within the self-describing data structure on an execution path of a query executed according to the query definition;
    for each respective domain of the one or more domains associated with the requested item:
        determine one or more subdomains associated with the requested item, wherein the one or more subdomains are located in the respective domain;
        determine a role of the user for the respective domain, wherein the role is associated with a set of access permissions to items of data within the domain; and
        generate an output corresponding to whether access to the requested item is granted based on a policy for each of the one or more subdomains associated with the requested item and the role of the user for the domain, wherein to generate the output, the processing device is further to:
            determine a first state of the requested item, the first state associated with a subdomain item state;
            determine a second state of a root item of the respective domain, the second state associated with a root item state; and
            identify the output in a rule data structure based on the first state of the requested item, the second state of the root item, and the role of the user.

11. The computer-readable medium of claim 10, wherein the one or more processing devices are further to:
    combine the output generated for each of the one or more domains to determine whether to grant access to the user to the requested item in the one or more subdomains located in the respective domain, wherein access is granted to the requested item if the output generated for any of the one or more domains indicates that access to the requested item is granted for the role of the user in any of the one or more subdomains.

12. The computer-readable medium of claim 10, wherein the requested item is included in a first domain and a second domain, the query definition specifies accessing the requested item in the first domain, and the one or more processing devices are further to:
   determine that the user has access to the requested item in the second domain based on the policy for a second subdomain of the second domain and the role of the user; and
   generate the output to indicate that access to the user to the requested item is granted in the first domain based on determining that the user has access to the requested item in the second domain.

13. The computer-readable medium of claim 10, wherein the one or more processing devices are further to maintain, in memory, a mapping of the one or more domains each including one or more subdomains and the set of items the one or more subdomains.

14. The computer-readable medium of claim 13, wherein the one or more processing devices are further to update the mapping when data included in the set of items is modified.

15. A system, comprising:
   a memory device storing instructions; and
   a processing device operatively coupled to the memory device, the processing device to execute the instructions to:
      obtain a query definition specifying a requested item of data in a self-describing data structure;
      determine one or more domains associated with the requested item, the one or more domains comprising a set of items within the self-describing data structure on an execution path of a query executed according to the query definition;
      for each respective domain of the one or more domains associated with the requested item:
         determine one or more subdomains associated with the requested item, wherein the one or more subdomains are located in the respective domain;
         determine a role of the user for the respective domain, wherein the role is associated with a set of access permissions to items of data within the domain; and
         generate an output corresponding to whether access to the requested item is granted based on a policy for each of the one or more subdomains associated with the requested item and the role of the user for the domain, wherein to generate the output, the processing device is further to:
            determine a first state of the requested item, the first state associated with a subdomain item state;
            determine a second state of a root item of the respective domain, the second state associated with a root item state; and
            identify the output in a rule data structure based on the first state of the requested item, the second state of the root item, and the role of the user.

16. The system of claim 15, wherein the processing device is further to:
   determine that the user does not have access to the requested item in a first domain based on the policy for a first subdomain of the first domain and the role of the user;
   determine that the user has access to the requested item in a second domain based on the policy for a second subdomain of the second domain and the role of the user; and
   generate the output to indicate that access to the user to the requested item is granted in the first domain based on determining that the user has access to the requested item in the second domain.

17. The system of claim 15, wherein the one or more processing devices are further to maintain, in memory, a mapping of the one or more domains each including one or more subdomains and the set of items the one or more subdomains.

* * * * *